(12) United States Patent  
Luna et al.

(10) Patent No.: US 9,349,282 B2
(45) Date of Patent: May 24, 2016

(54) PROXIMITY SENSING DEVICE CONTROL ARCHITECTURE AND DATA COMMUNICATION PROTOCOL

(71) Applicants: Michael Edward Smith Luna, San Jose, CA (US); Hawk Yin Pang, San Jose, CA (US)

(72) Inventors: Michael Edward Smith Luna, San Jose, CA (US); Hawk Yin Pang, San Jose, CA (US)

(73) Assignee: AliphCom, San Francisco, CA (US)

( * ) Notice: Subject to any disclaimer, the term of this patent is extended or adjusted under 35 U.S.C. 154(b) by 54 days.

(21) Appl. No.: 14/210,234

(22) Filed: Mar. 13, 2014

(65) Prior Publication Data

US 2014/0270306 A1   Sep. 18, 2014

Related U.S. Application Data

(60) Provisional application No. 61/802,344, filed on Mar. 15, 2013.

(51) Int. Cl.

| | |
|---|---|
| *G08C 17/02* | (2006.01) |
| *H04R 3/00* | (2006.01) |
| *H04R 29/00* | (2006.01) |
| *G01S 5/18* | (2006.01) |
| *G01S 11/06* | (2006.01) |
| *H04R 1/02* | (2006.01) |
| *H04R 3/12* | (2006.01) |

(52) U.S. Cl.
CPC . *G08C 17/02* (2013.01); *G01S 5/18* (2013.01); *G01S 11/06* (2013.01); *H04R 1/025* (2013.01); *H04R 3/00* (2013.01); *H04R 29/001* (2013.01); *H04R 1/028* (2013.01); *H04R 3/12* (2013.01); *H04R 2227/003* (2013.01); *H04R 2420/07* (2013.01); *H04R 2499/11* (2013.01)

(58) Field of Classification Search
CPC ...... H04R 1/02; H04R 2499/11; H04R 1/028; H04R 2420/07; H04R 1/025; H04R 1/021; H04R 1/023
USPC ........................................................ 381/334
See application file for complete search history.

(56) References Cited

U.S. PATENT DOCUMENTS 8,249,276 B2 * 8/2012 Hamada ................. A63F 13/10
 381/99
2007/0002742 A1   1/2007 Krishnaswamy et al.

(Continued)

FOREIGN PATENT DOCUMENTS

| EP | 1793326 A2 | 1/2003 |
| WO | 2014146002 | 9/2014 |

OTHER PUBLICATIONS

Copenheaver, Blaine R., International Searching Authority, International Search Report and Written Opinion of the International Searching Authority, mailed Sep. 16, 2014 for International Patent Application No. PCT/US2014/030870.

*Primary Examiner* — Mark Blouin
(74) *Attorney, Agent, or Firm* — Kokka & Backus, PC

(57) ABSTRACT

Mobile device speaker control may include: monitoring one or more devices wirelessly coupled with a data network, receiving one or more data packets from each of the one or more devices, filtering received data packets by evaluating a received signal strength (e.g., RSSI) of the received packets, comparing the received signal strength of each of the received packets to a threshold to determine whether the one or more devices are to perform an action, and performing the action only if one or more indicia other than the received signal strength indicate a near field proximity within the threshold or a direct physical contact between a wireless device receiving the data packets and one of the one or more devices that is wirelessly transmitting the data packets.

20 Claims, 25 Drawing Sheets

(56) References Cited

U.S. PATENT DOCUMENTS

| | | |
|---|---|---|
| 2007/0116007 A1 | 5/2007 | Xiao et al. |
| 2008/0240078 A1 | 10/2008 | Thubert et al. |
| 2008/0273518 A1 | 11/2008 | Pratt et al. |
| 2009/0144456 A1 | 6/2009 | Gelf et al. |
| 2011/0059768 A1 | 3/2011 | Pandruvada |
| 2012/0083705 A1 | 4/2012 | Yuen et al. |
| 2014/0270275 A1* | 9/2014 | Niedzwiedz ............ H04R 1/04 381/190 |

* cited by examiner

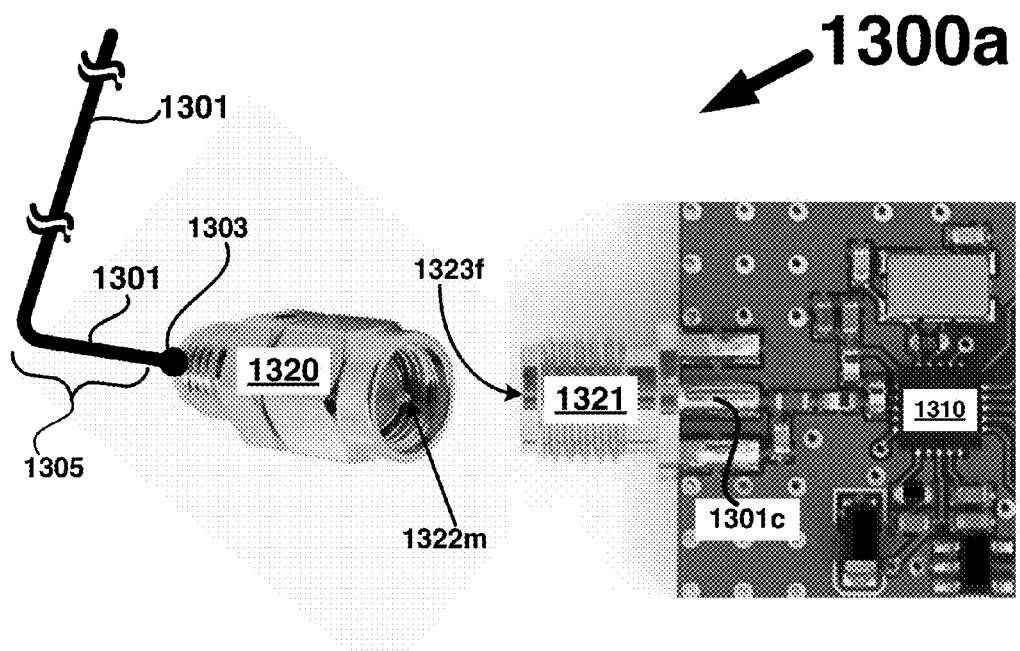
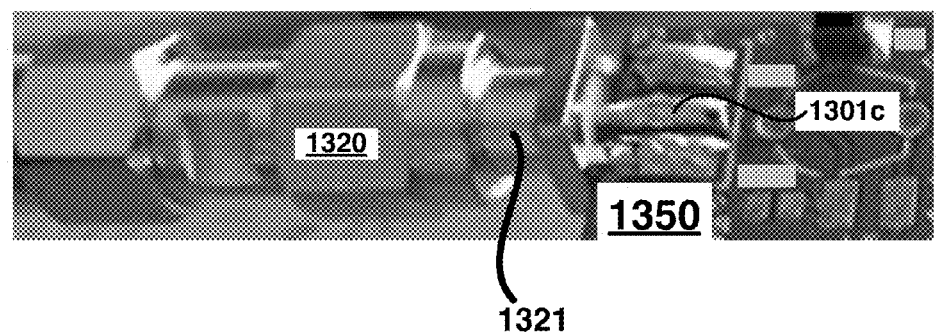
FIG. 13

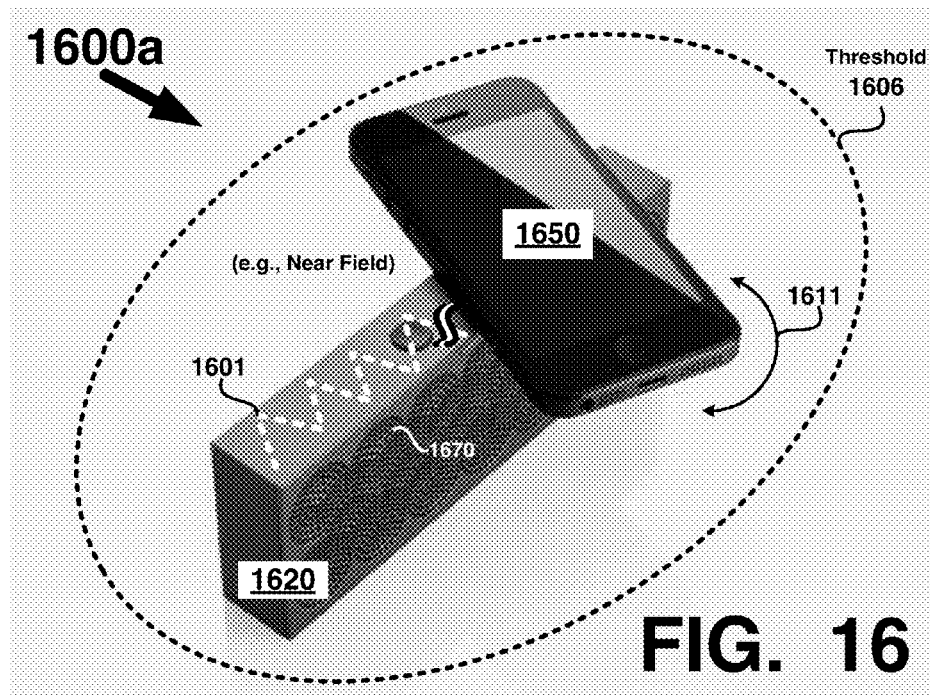
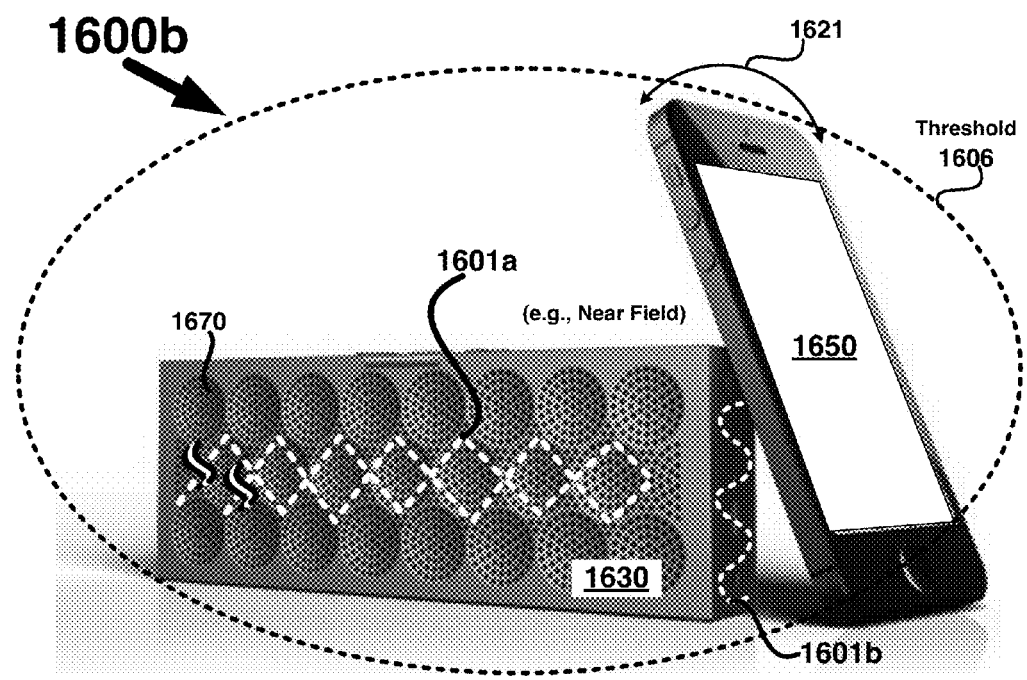
FIG. 16

PROXIMITY SENSING DEVICE CONTROL ARCHITECTURE AND DATA COMMUNICATION PROTOCOL

CROSS-REFERENCE TO RELATED APPLICATIONS

This application claims benefit and right of priority under 35 U.S.C. §119(e) to U.S. Provisional Patent Application No. 61/802,344, Filed on Mar. 15, 2013, and Titled "Proximity Sensing Device Control Architecture And Data Communication Protocol", which is herein incorporated by reference in its entirety for all purposes.

FIELD

The present invention relates generally to electrical and electronic hardware, audio equipment, wired and wireless network communications, data processing, and computing devices. More specifically, techniques for mobile device speaker control are described.

BACKGROUND

In conventional speaker systems, there are solutions for controlling individual speakers or using a control component for managing a group of speakers. However, these conventional solutions rely upon wired connections or, in the case of wireless connections, individual speakers are often controlled by a single device, which is often inflexible and confines media to that selected using the single control device. Further, conventional solutions are often time-consuming and technically complex to set up and manage, often requiring extensive training or expertise to operate.

Conventional media playback solutions are typically found in mobile devices such as mobile phones, smart phones, or other devices. Unfortunately, conventional speaker control devices are often limited connections between a mobile device and a single speaker. Further, the range of actions that can be taken are often limited to the device that is in data communication with a given speaker. If different users with different playlists and mobile devices want to use a given speaker, individual connections often need to be established manually regardless of the type of data communication protocol used.

Current radio standards (e.g., Bluetooth systems, WiFi systems) allow for a receiver to measure signal strength (e.g., of a RF signal) from a source transmitting data and one measure of signal strength includes received signal strength (RSSI). Although there have been studies that utilize RSSI information to understand how well RSSI values correlate to how far away a transmitter and a receiver are from one another, it is also known that it is difficult to utilize RSSI for distance measurements due to a number of factors. One of those factors may include a multipath effect where the RF signal being transmitted reflects off of surrounding objects, such as walls, stationary objects, and moving objects. Another factor may include antenna radiation pattern and polarization of antenna of the transmitter and the antenna of the receiver, both of which may contribute to RSSI error vs. distance. However, close distance measurements perform with higher accuracy than long distance measurement due to an inverse square power drop off (e.g., $1/R^2$ where R=Distance) in a far field region, and where for a near field region the inverse power drop can be greater than $1/R^3$ of the RF signal as a function of distance between the transmitter and the receiver. Close proximity sensing can be utilized to improve intuitiveness on how two or more devices interact with one another rather than having a user interact with them. One example is for the user to place one of the devices close to another device, within boundaries of a set threshold RSSI for close proximity detection. Although close proximity sensing via RSSI may have a statistically high level of accuracy and a device may infer that two devices are close to one another, there still exists a small probability that a false alarm can be triggered (i.e., the device is detected as being in close proximity, but actually in reality the device is not in close proximity). In conventional implementations, use cases would require perfect or near perfect inference of close proximity of the devices.

Thus, a need exists for a for speaker control solution without the limitations of conventional techniques and a solution that does not trigger false alarms when a received RSSI value is within a pre-determined RSSI threshold value, but the devices are not within close proximity of one another.

BRIEF DESCRIPTION OF THE DRAWINGS

Various embodiments or examples ("examples") are disclosed in the following detailed description and the accompanying drawings:

FIG. 13 depicts examples of connectors that may be used to electrically couple an antenna that may be detuned to be non-resonant at a frequency of interest with circuitry of a RF system;

FIG. 16 depicts other examples of wireless client devices in near-field proximity of a wireless device including one or more antennas that may be detuned to be non-resonant at a frequency of interest;

Figure 1:
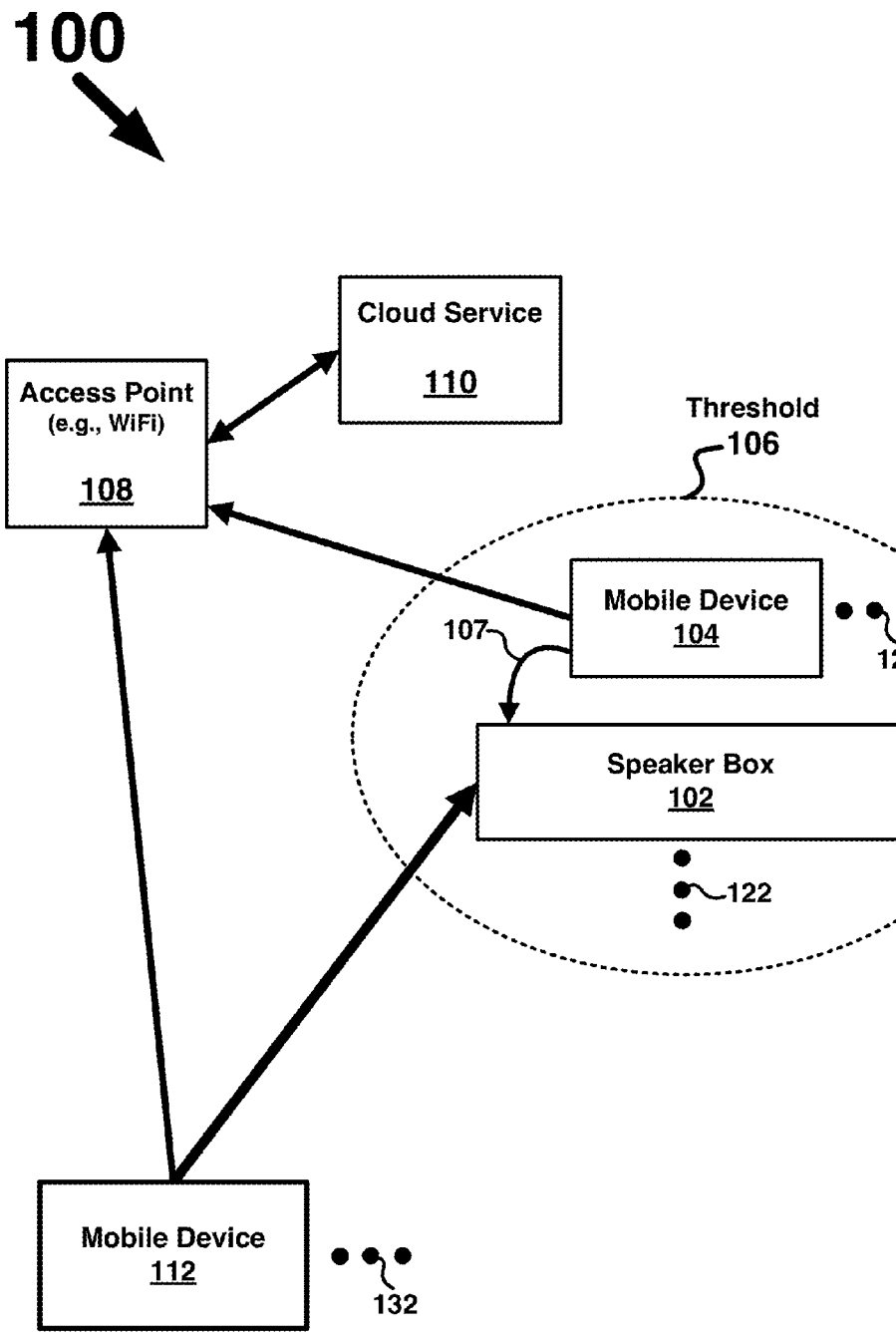
FIG. 1 illustrates an exemplary proximity sensing device control architecture and data communication protocol.

Although the above-described drawings depict various examples of the present application, the present application is not limited by the depicted examples. It is to be understood that, in the drawings, like reference numerals designate like structural elements. Also, it is understood that the drawings are not necessarily to scale.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

FIG. 1 illustrates an exemplary proximity sensing device control architecture and data communication protocol. Here, system 100 includes speaker box 102, mobile device 104, received signal strength indicator (RSSI) threshold 106, Wi-Fi access point 108, cloud service 110, and mobile device 112. In some examples, speaker box 102 may refer to any type of speaker, speaker system, speaker network, single or group of speakers configured to render audible various types of media including music, song, audio, video, multi-media, or other types of media, without limitation to format, protocol, or other technical characteristics. Speaker box 102, in some examples, may be configured for wired or wireless data communication in order to play files that may be digitally encoded without limitation to data formats, types, or data communication protocols (e.g., Bluetooth (BT), Bluetooth Low Energy (BTLE), Wi-Fi (also used interchangeably herein with "WiFi" or "wifi" without limitation), ZigBee, Near Field Communications (NFC), or others, without limitation). Speaker box 102 may also be configured to encode, decode, encrypt, or decrypt data for use with the techniques described herein. Speaker box 102 may, in some examples, be implemented using a device such as the JAMBOX™ from AliphCom of San Francisco, Calif.

As used herein, mobile devices 104 and 112 may be implemented as smart phones, mobile phones, cell phones, mobile computing devices (e.g., tablet computers, laptop computers, notebook computers, or any other portable or mobile computer, without limitation), personal digital assistants (PDA), portable media devices, electronic readers, and the like, without limitation. Mobile devices 104 and 112 and speaker box 102 may be configured to access Wi-Fi access point 108 in order to retrieve data from a cloud service 110, which may also be in direct or indirect data communication with one or more data sources, databases, repositories, or other data storage facilities (not shown).

In some examples, encrypted or unencrypted data packets may be transferred by mobile device 104 or 112 to speaker box 102. However, RSSI threshold 106 (threshold 106 hereinafter) may be used to determine which of mobile device 104 or 112 may control or interface with speaker box 102. As an example, a received signal strength indicator (RSSI) may be detected for each of mobile devices 104 and 112 and used in a comparison against a pre-set received signal strength threshold (e.g., threshold 106). If the RSSI for mobile device 104 is greater than threshold 106 and the RSSI for mobile device 112 is less than threshold 106, mobile device 104 may be prioritized over mobile device 112 for control of speaker box 102. In some examples, prioritization may be performed by ranking, prioritizing, or otherwise listing an address (e.g., media access control (MAC) address, internet protocol (IP), or other type of address that may be used to identify mobile device 104, mobile device 112, speaker box 102, or Wi-Fi access point 108 (hereafter referred to as access point 108).

If mobile device 104 is prioritized (e.g., listed by MAC address as having a RSSI that is greater than threshold 106 and greater than that of mobile device 112 or any other mobile device (not shown)) higher than other mobile devices (e.g., mobile device 112), then system 100 may be used to award or assign control of speaker box 102 to mobile device 104, in some examples. As shown, access point 108 may be configured to handle any type of wired or wireless data communication protocol such as Wi-Fi, among others. As described above, the threshold comparison and determination of control and, as described below, other actions that may be taken may be initiated and performed when mobile device 104 is brought 107 in close proximity to speaker box 102 (e.g., mobile device 104 in contact with speaker box 102, see 1650 on top of 1620 in FIG. 16). In other examples, mobile device 104 may also be brought in close proximity to another device apart from speaker box 102 that may be used for configuring control of speaker box 102. Using the techniques described above, proximity may be determined using a variety of techniques to determine a distance or proximity of a source device (e.g., a device having media that may be played on speaker box 102). In some examples, using pre-installed antennas and applications, as will be described below, speaker box 102 or another device (not shown) may be used to control speaker box 102. As an example, when a mobile device or other type of media device (e.g., mobile device 104, 112) is brought 107 in close proximity to speaker box 102 (e.g., NFC within a few inches or Wi-Fi within 20 or 30 yards), control may be established. Further, after establishing control, actions may be initiated or performed to allow media to be played through speaker box 102. In still other examples, system 100 and the above-described elements may be implemented differently in function, structure, configuration, or other aspects and are not limited to those shown and described.

Figure 2A:
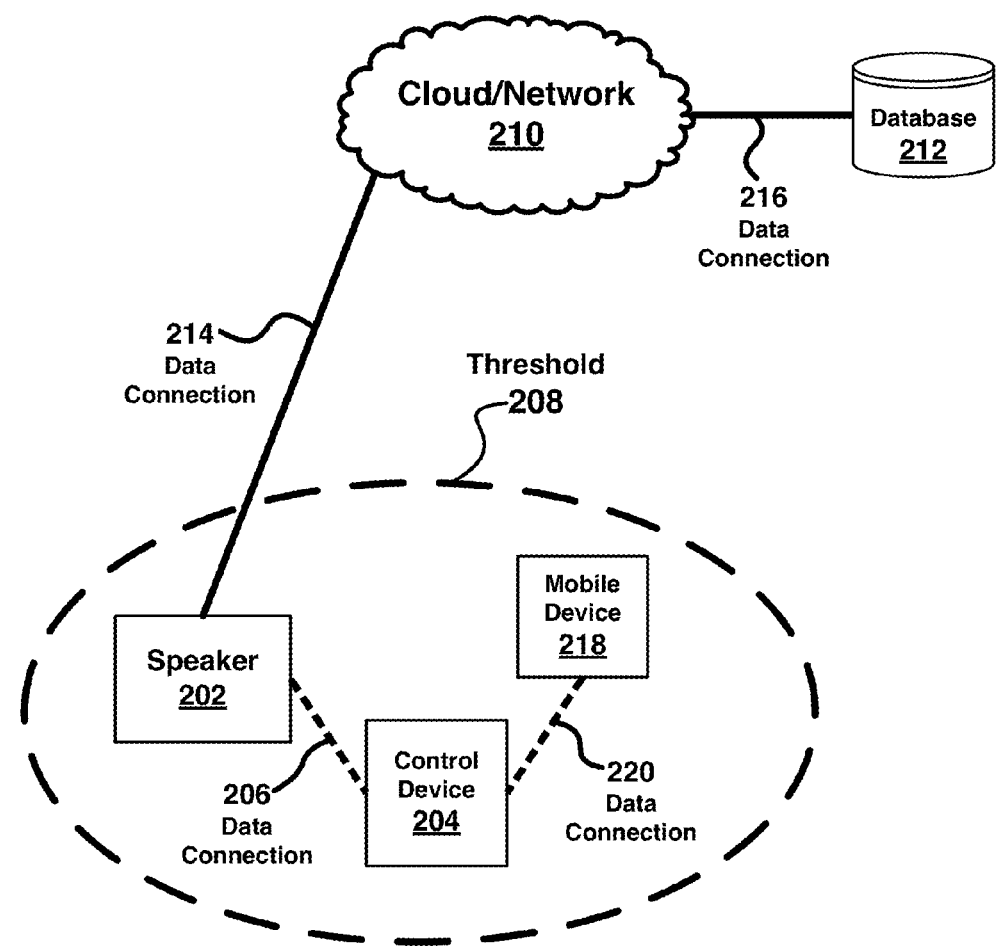
FIG. 2A illustrates another exemplary proximity sensing device control architecture and data communication protocol.

FIG. 2A illustrates another exemplary proximity sensing device control architecture and data communication protocol. Here, system 200 includes speaker 202 (e.g., such as speaker box 102 of FIG. 1), control device 204, data connections 206, 214, 216, and 220, threshold 208, cloud/network 210, database 212, and mobile device 218. In some examples, techniques for mobile device speaker control may be implemented for mobile device 218 to control speaker 202 using control device 204, all of which may be in data communication with each other using wired or wireless data communication protocols. In other examples, system 200 and the above-described elements may be implemented differently and are not limited to the functions, structures, or configurations shown and described.

Figure 2B:
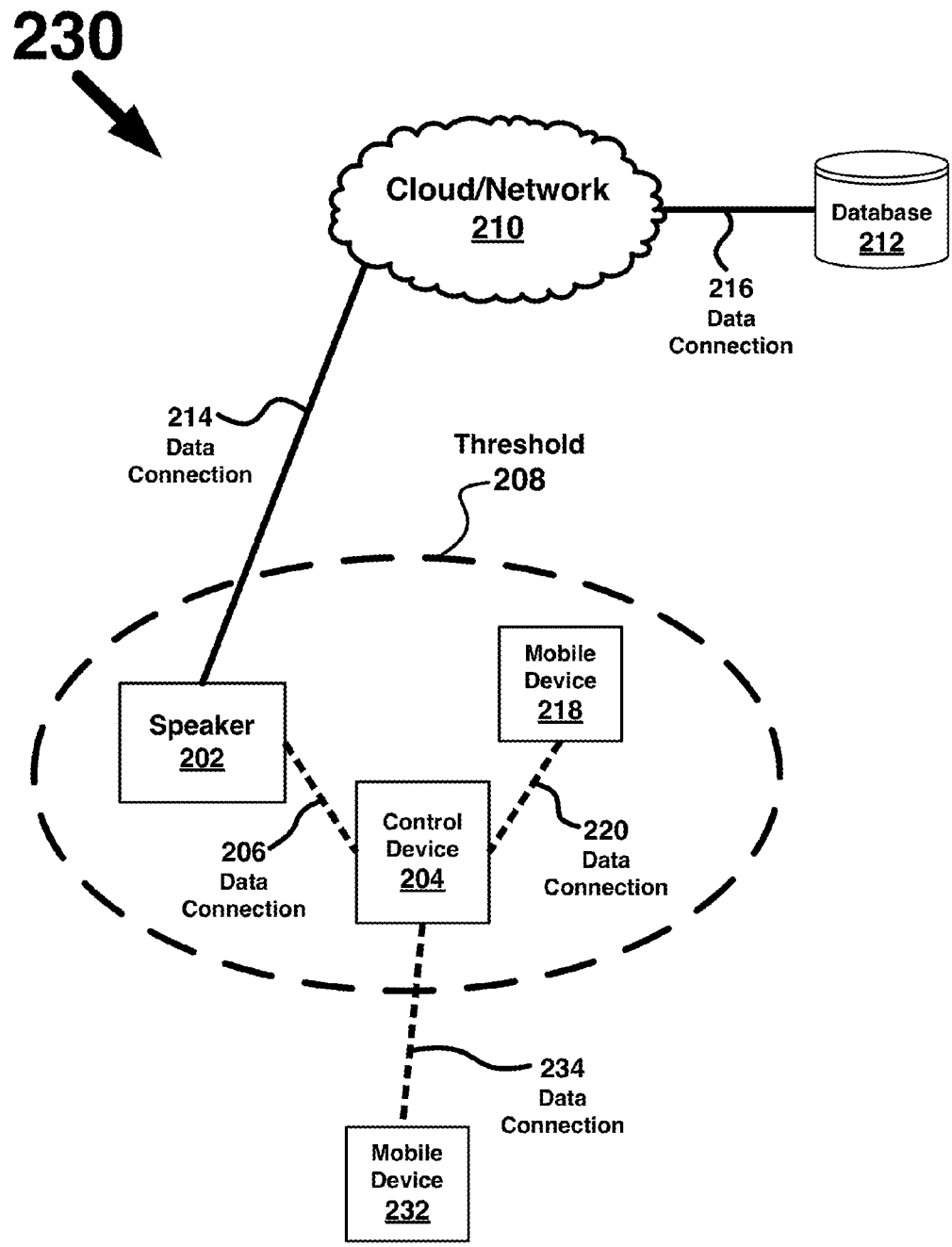
FIG. 2B illustrates yet another exemplary proximity sensing device control architecture and data communication protocol.

FIG. 2B illustrates yet another exemplary proximity sensing device control architecture and data communication protocol. Here, system 230 includes speaker 202 (e.g., such as speaker box 102 of FIG. 1), control device 204, data connections 206, 214, 216 and 220, RSSI threshold 208 (threshold 208 hereinafter), cloud/network 210, database 212, and mobile devices 218 and 232, the latter of which may be in data communication with control device 204 using data connection 234, which may be implemented as a wired, wireless, optical, or other type of data connection. In some examples, techniques for mobile device speaker control may be implemented for mobile device 218 to control speaker 202 using control device 204, all of which may be in data communication with each other using wired or wireless data communication protocols. If one or more other mobile devices (e.g., mobile device 232) are brought in close proximity, but not within threshold 208, speaker control may still be assigned to mobile device 218 or another device with a RSSI that exceeds threshold 208. In other examples, a determination as to which mobile device (e.g., 218 or 232) to assign control may be determined differently and is not limited to comparing RSSI values to threshold 208. For example, control of speaker 202 (e.g., speaker box 102 of FIG. 1) may be awarded manually or assigned based on a more complex algorithm. Regardless and, in other examples, system 230 and the above-described elements may be implemented differently and are not limited to the functions, structures, or configurations shown and described.

Figure 2C:
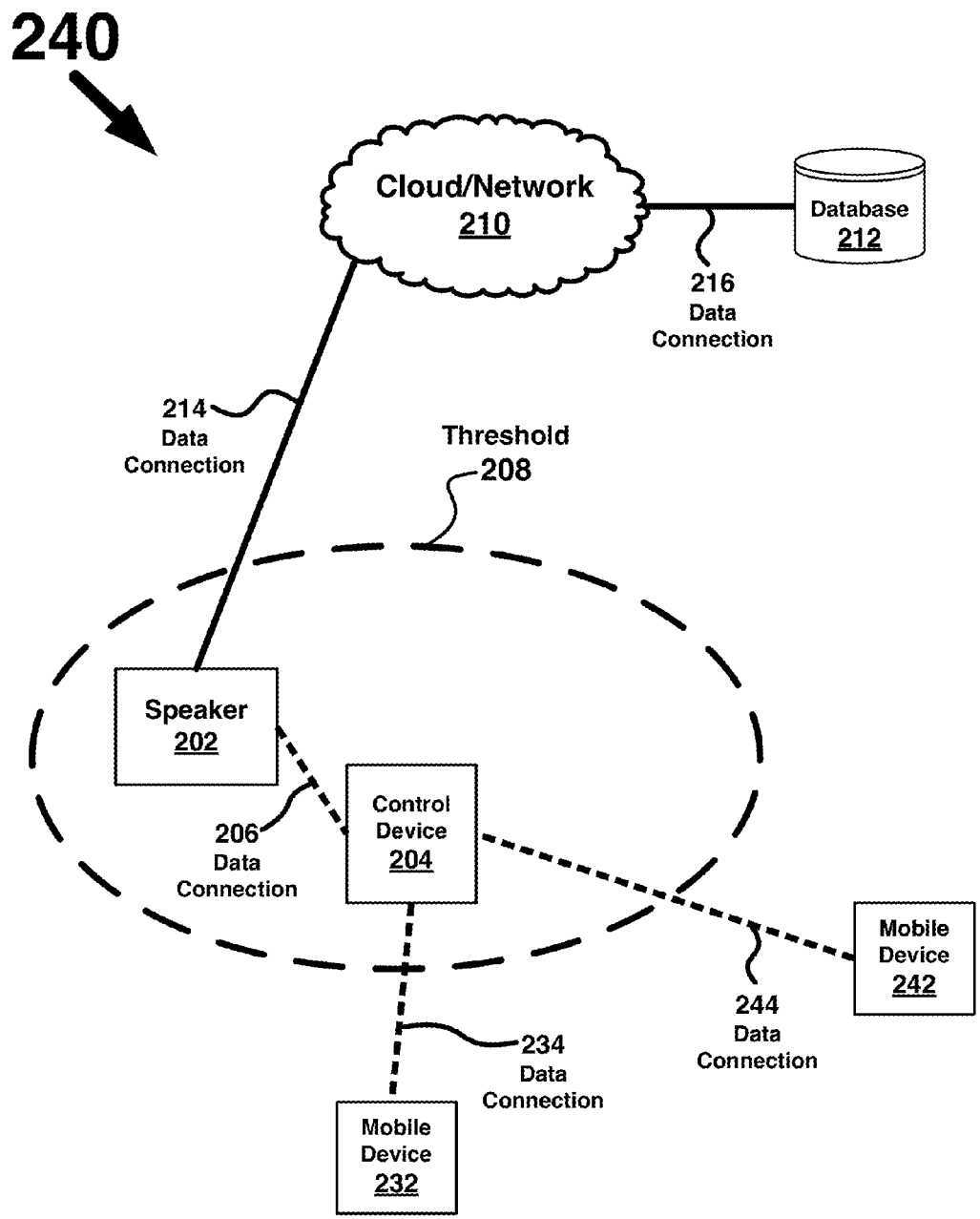
FIG. 2C illustrates a further exemplary proximity sensing device control architecture and data communication protocol.

FIG. 2C illustrates a further exemplary proximity sensing device control architecture and data communication protocol. Here, system 240 includes speaker 202 (e.g., such as speaker box 102 of FIG. 1), control device 204, data connections 206, 214, 216, 234 and 244, threshold 208, cloud/network 210, database 212, mobile device 232 and mobile device 242. In some examples, techniques for mobile device speaker control may be implemented for mobile device 244 and/or mobile device 232 to control speaker 202 using control device 204, all of which may be in data communication with each other using wired or wireless data communication protocols. As an example, if neither device (e.g., 232, 242) is within threshold 208, than speaker control may be configured to remain with the last device (e.g., either 232 or 242) to which it was assigned by control device 204. In other examples, system 240 and the above-described elements may be implemented differently and are not limited to the functions, structures, or configurations shown and described.

Figure 3A:
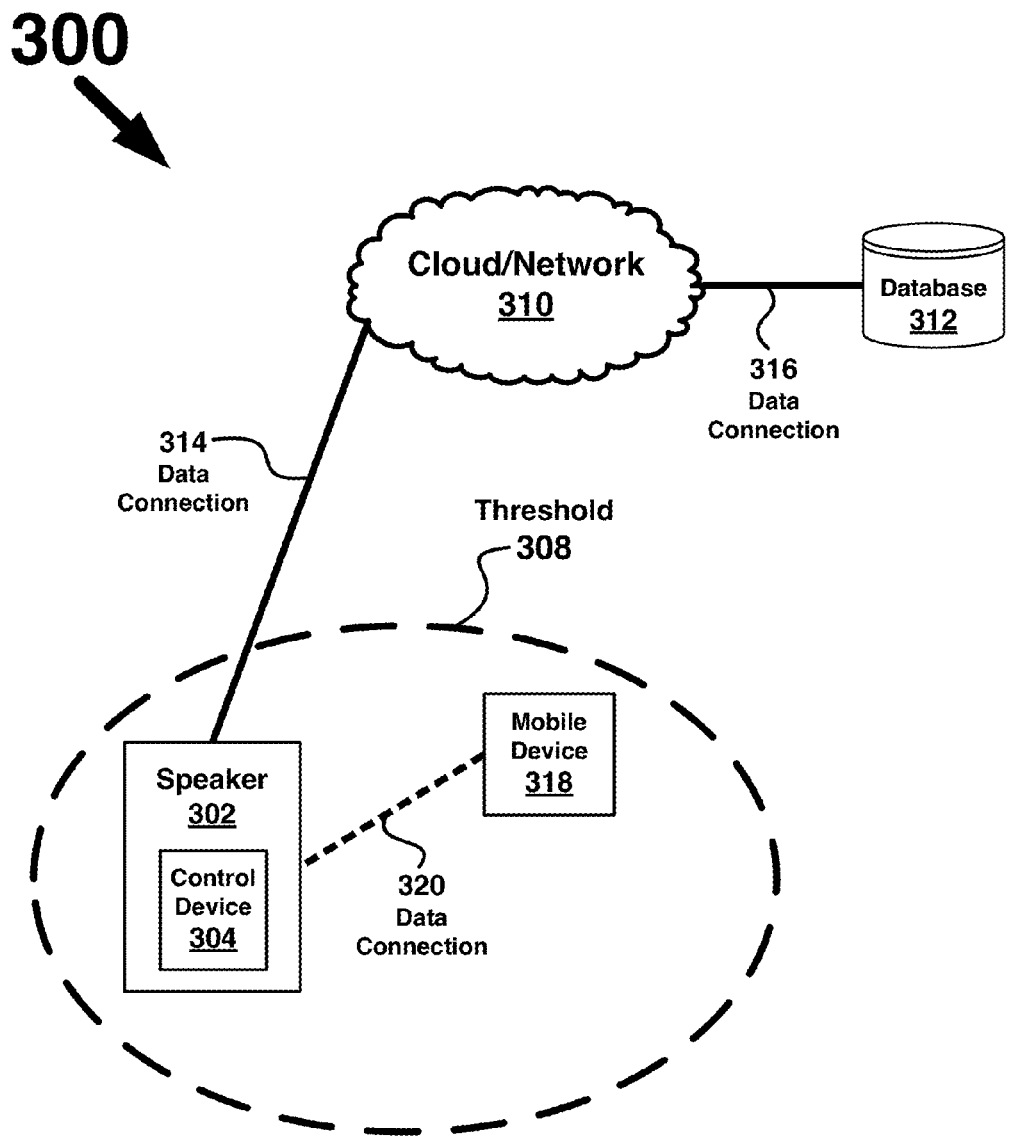
FIG. 3A illustrates an alternative exemplary proximity sensing device control architecture and data communication protocol.

FIG. 3A illustrates an alternative exemplary proximity sensing device control architecture and data communication protocol. Here, system 300 includes speaker 302, control device 304 included in speaker 302, data connections 320, 314 and 316, RSSI threshold 308 (threshold 308 hereinafter), cloud/network 310, database 312, and mobile device 318. Speaker 302 may be similar to the speaker box 102 of FIG. 1; however, unlike speaker box 102, speaker 302 includes control device 304. In some examples, techniques for mobile device speaker control may be implemented for mobile device 318 to control speaker 302 using its internal control device 304, all of which may be in data communication with each other using wired or wireless data communication protocols. In other examples, system 300 and the above-described elements may be implemented differently and are not limited to the functions, structures, or configurations shown and described.

Figure 3B:
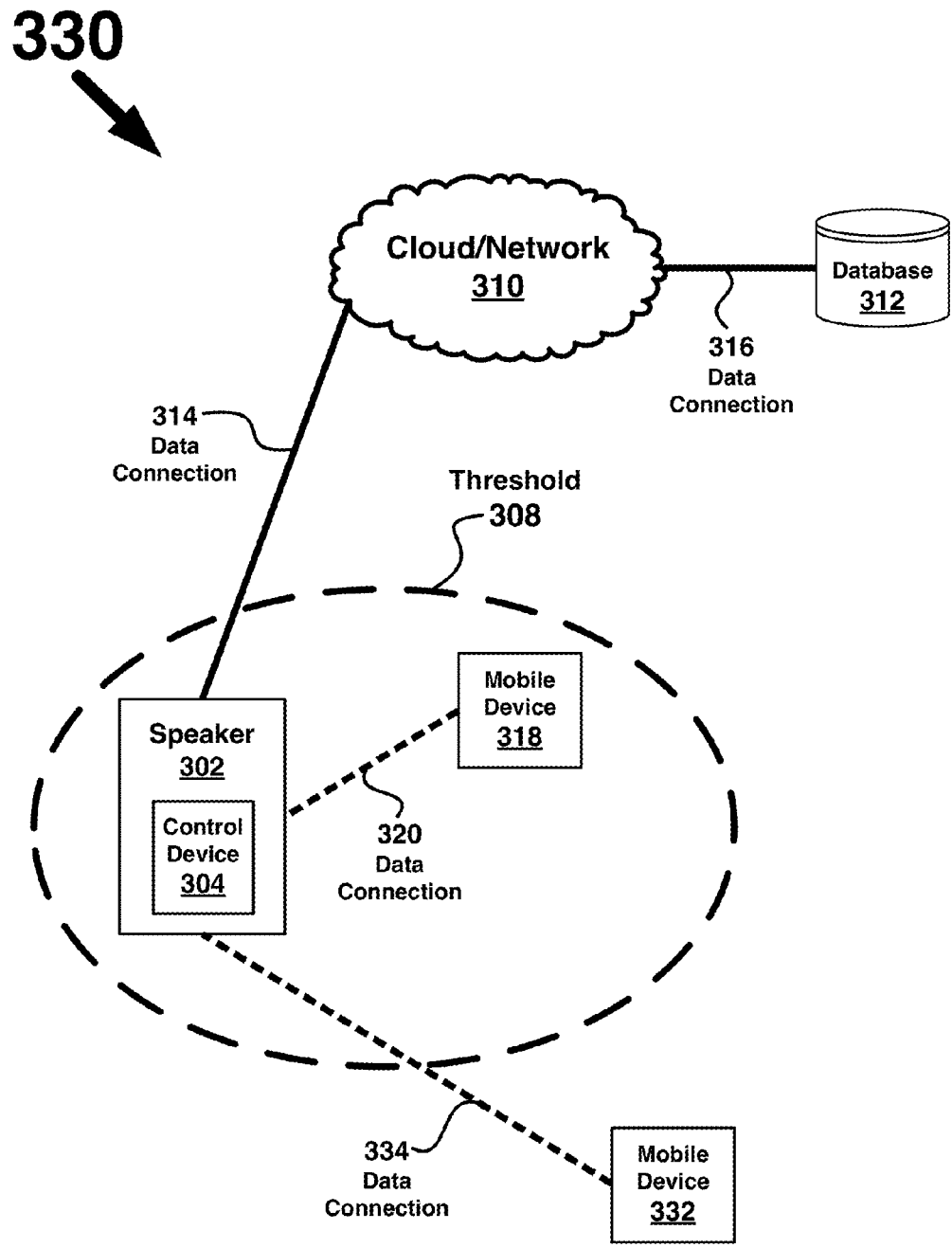
FIG. 3B illustrates another alternative exemplary proximity sensing device control architecture and data communication protocol.

FIG. 3B illustrates another alternative exemplary proximity sensing device control architecture and data communication protocol. Here, system 330 includes speaker 302, control device 304 included in speaker 302, data connections 314, 316 and 320, threshold 308, cloud/network 310, database 312, and mobile devices 318 and 332, the latter of which may be in data communication with control device 304 using data connection 334, which may be implemented as a wired, wireless, optical, or other type of data connection. In some examples, techniques for mobile device speaker control may be implemented for mobile device 318 to control speaker 302 using its internal control device 304, all of which may be in data communication with each other using wired or wireless data communication protocols. If one or more other mobile devices (e.g., mobile device 232) are brought in close proximity, but not within threshold 308, speaker control may still be assigned to mobile device 318 or another device with a RSSI that exceeds threshold 308. In other examples, a determination as to which mobile device (e.g., 318 or 332) to assign control may be determined differently and is not limited to comparing RSSI values to threshold 308. For example, control of speaker 302 (e.g., speaker box 102 of FIG. 1) may be awarded manually or assigned based on a more complex algorithm. Regardless and, in other examples, system 330 and the above-described elements may be implemented differently and are not limited to the functions, structures, or configurations shown and described.

Figure 3C:
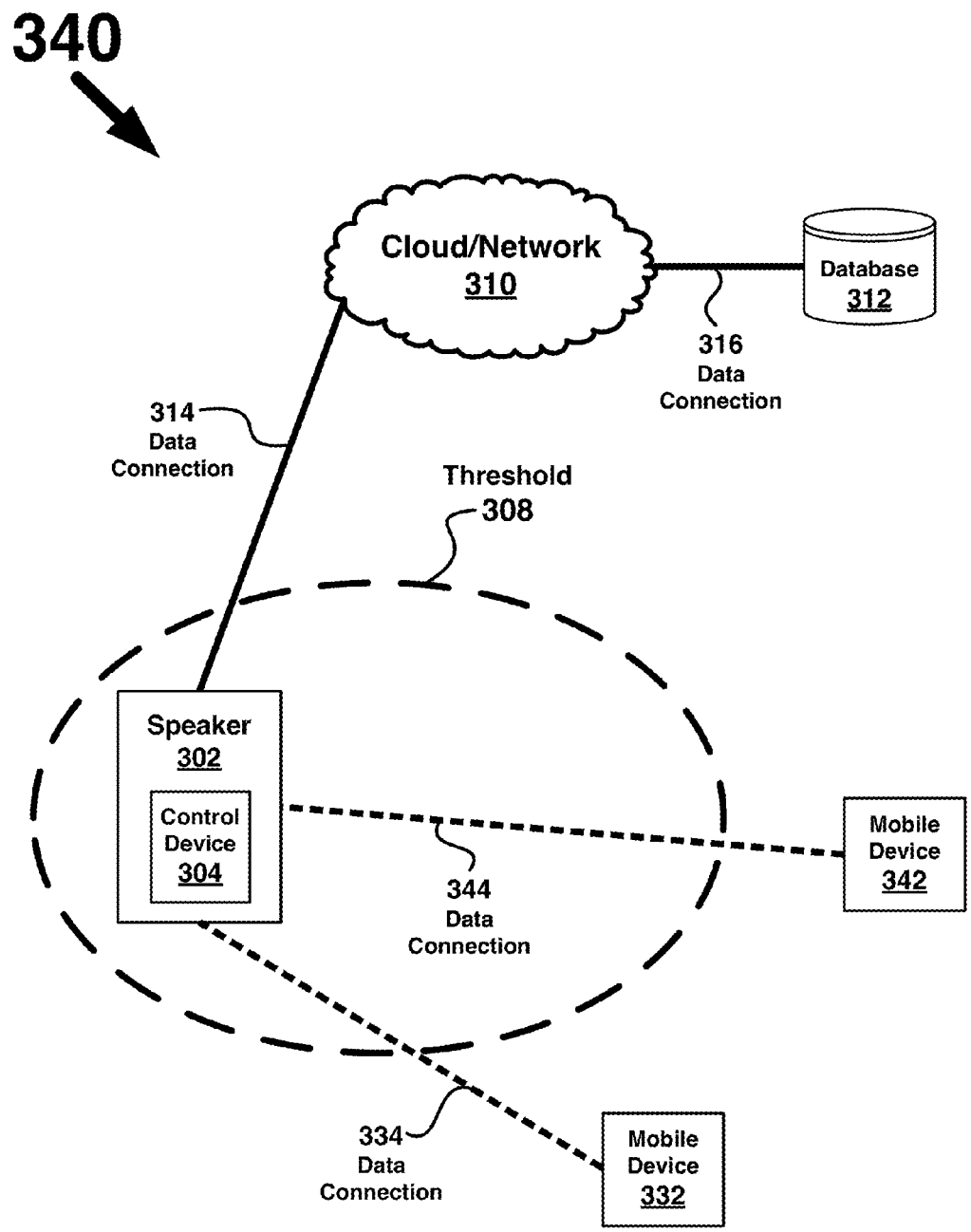
FIG. 3C illustrates yet another alternative exemplary proximity sensing device control architecture and data communication protocol.

FIG. 3C illustrates yet another alternative exemplary proximity sensing device control architecture and data communication protocol. Here, system 340 includes speaker 302, control device 304 included in speaker 302, data connections 214, 216, 334 and 344, threshold 308, cloud/network 310, database 312, mobile device 332 and mobile device 342. In some examples, techniques for mobile device speaker control may be implemented for mobile device 344 and/or mobile device 332 to control speaker 302 using its internal control device 304, all of which may be in data communication with each other using wired or wireless data communication protocols. As an example, if neither device (e.g., 332, 342) is within threshold 308, then speaker control may be configured to remain with the last device (e.g., either 332 or 342) to which it was assigned by control device 304. In other examples, system 340 and the above-described elements may be implemented differently and are not limited to the functions, structures, or configurations shown and described.

Figure 4A:
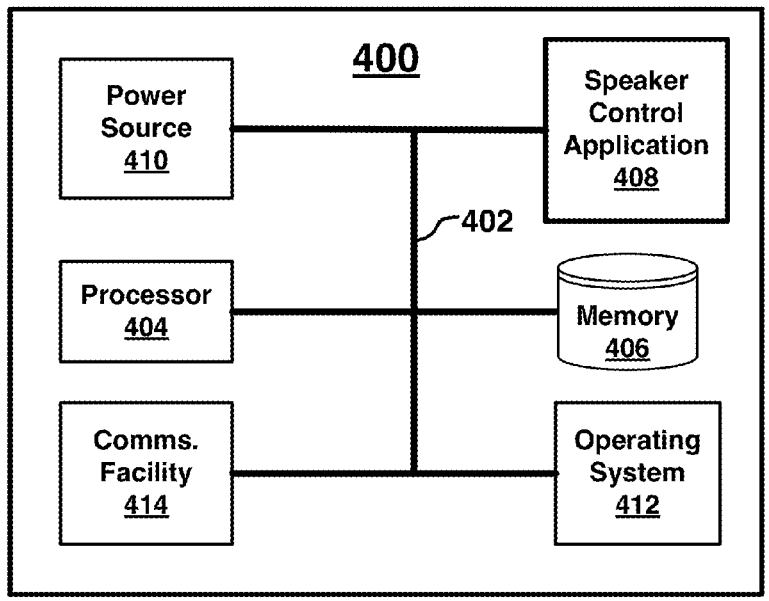
FIG. 4A illustrates an exemplary mobile device architecture for proximity sensing device control architecture and data communication protocol.

FIG. 4A illustrates an exemplary mobile device architecture for proximity sensing device control architecture and data communication protocol. Here, mobile device architecture 400 may include a bus 402 or other communication mechanism for communicating information, which interconnects subsystems and devices, such as memory 406 (e.g., non-volatile and/or volatile memory), speaker control application 408 (e.g., an Application), a power source 410 (e.g., an AC or DC power source), a processor (e.g., a CPU, controller, DSP, μP, μC, etc.), a communication facility 414 (e.g., for wired and/or wireless communication), and an Operating System (e.g., OS). OS 412 and/or speaker control application 408 may include executable instructions embodied in a non-transitory computer readable medium, such as memory 406 or other form of non-transitory data storage medium or system.

Figure 4B:
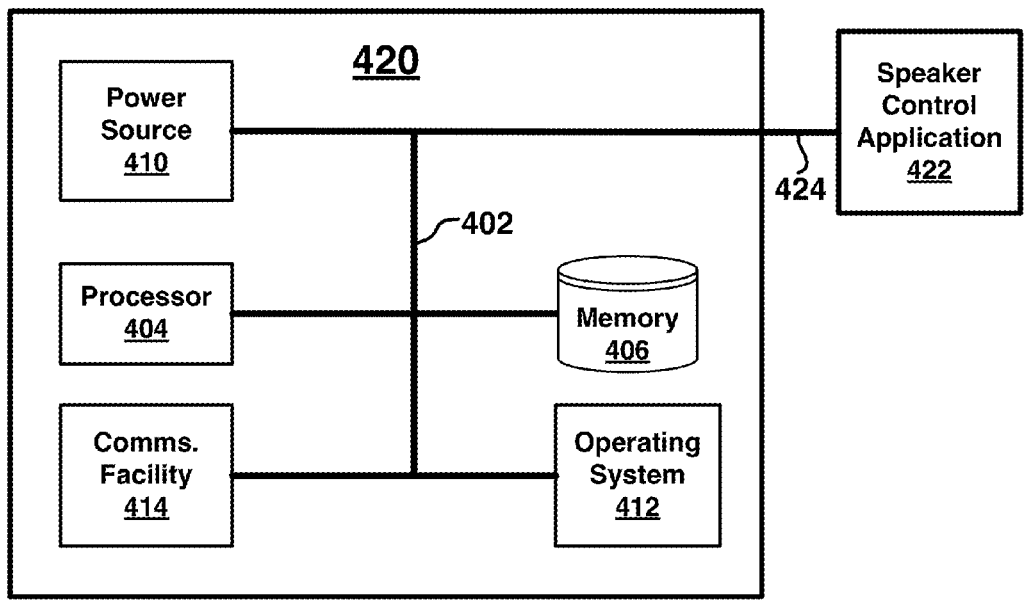
FIG. 4B illustrates an alternative exemplary proximity sensing device control architecture and data communication protocol.

FIG. 4B illustrates an alternative exemplary proximity sensing device control architecture and data communication protocol. Here, mobile device architecture 420 may include a bus 402 or other communication mechanism for communicating information, which interconnects subsystems and devices, such as memory 406 (e.g., non-volatile and/or volatile memory), a power source 410 (e.g., an AC or DC power source), a processor (e.g., a CPU, controller, DSP, μP, μC, etc.), a communication facility 414 (e.g., for wired and/or wireless communication), and an Operating System (e.g., OS). OS 412 and/or speaker control application 408 may include executable instructions embodied in a non-transitory computer readable medium, such as memory 406 or other form of non-transitory data storage medium or system. Speaker control application 422 (e.g., an Application) may be positioned externally to mobile device architecture 420 and may be in communication 424 (wired and/or wireless) with subsystems and devices of mobile device architecture 420 via bus 402 and/or communication facility 414.

Figure 5A:
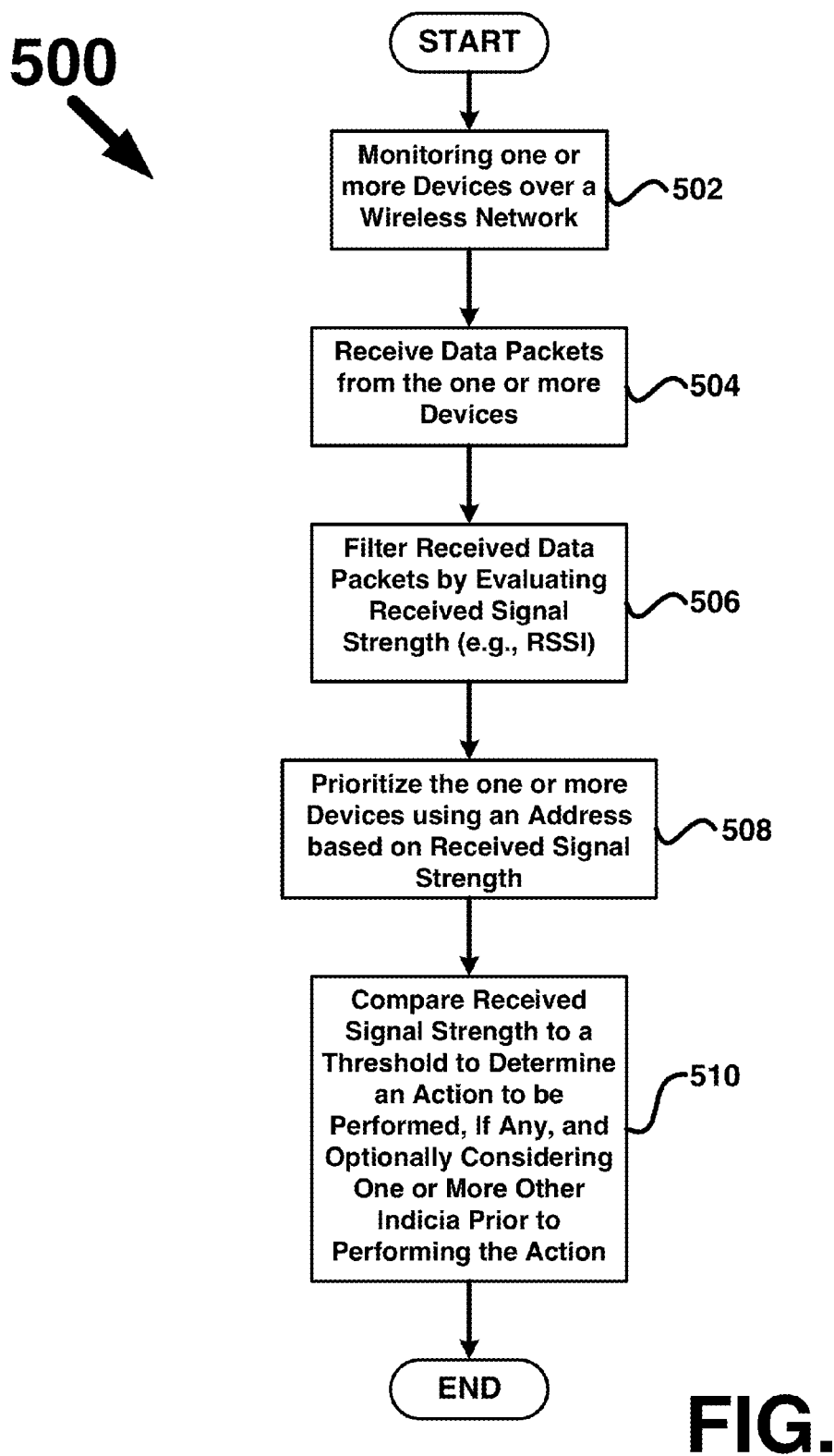
FIG. 5A illustrates an exemplary process for proximity sensing device control and data communication.

FIG. 5A illustrates an exemplary process 500 for proximity sensing device control and data communication. Process 500 may include a stage 502 where monitoring of one or more devices over a wireless network may be performed by speaker box (102, 202, 302) or another device, using one or more of its respective radios (e.g., WiFi, Bluetooth, etc.). The one or more devices may comprise one or more of the mobile devices described above (104, 112, 218, 232, 242, 318, 332, 342) or other mobile devices that emit RF signals that may be monitored by a RF system(s) and/or radio(s) of speaker box (102, 202, 302) or another device in communication with the speaker box, for example. The wireless network may comprise one or more wireless networks such as a WiFi network, a Bluetooth network, other networks, or a combination of the foregoing. Process 500 may include a stage 504 where data packets from the one or more wireless devices that were monitored (e.g., at the stage 502) are received. The data packets may be from a single wireless device or from a plurality of wireless devices. Data packets may be received by a RF system(s) and/or radio(s) of speaker box (102, 202, 302) or another device in communication with the speaker box. For example, the data packets may be received by a RF receiver or a RF transceiver included in the RF system(s) and/or the radio(s) of speaker box (102, 202, 302) or another device in communication with the speaker box. Process 500 may include a stage 506 where received data packets (e.g., received at the stage 504) are filtered (or otherwise processed and/or analyzed) by evaluating a Received Signal Strength (e.g., RSSI) of the received packets. Process 500 may include a stage 508 where one or more of the devices are prioritized using an address based on the Received Signal Strength (e.g., RSSI) of the one or more devices (e.g., from the filtering and evaluating at the stage 506). For example, prioritizing may comprise mobile device(s) having the highest Received Signal Strength (e.g., RSSI) being assigned a higher priority than mobile device(s) having lower Received Signal Strength (e.g., RSSI). Process 500 may include a stage 510 where Received Signal Strength (e.g., RSSI) is compared to a threshold value (e.g., threshold 106, 208, 308) to determine an action to be performed (e.g., streaming content, media, playback of music, video, etc., by speaker 108, 208, 308), if any. At the stage 510, optionally, as will be described below in reference to FIGS. 21-22, one or more other indicia may be considered prior to performing the action and the one or more indicia may determine if the action is to be performed regardless of the result of comparing the RSSI to the threshold. As described above, in other examples, a determination as to assignment of control (e.g., determining at the stage 510 an action to be performed, if any) may be determined differently and is not limited to comparing Received Signal Strength (e.g., RSSI) values to a threshold value (e.g., 106, 208, 308). In some examples, control may be awarded manually or assigned based on a more complex algorithm that may or may not include using Received Signal Strength (e.g., RSSI) values or comparing the Received Signal Strength values to some other metric such as the threshold (e.g., 106, 208, 308).

Figure 5B:
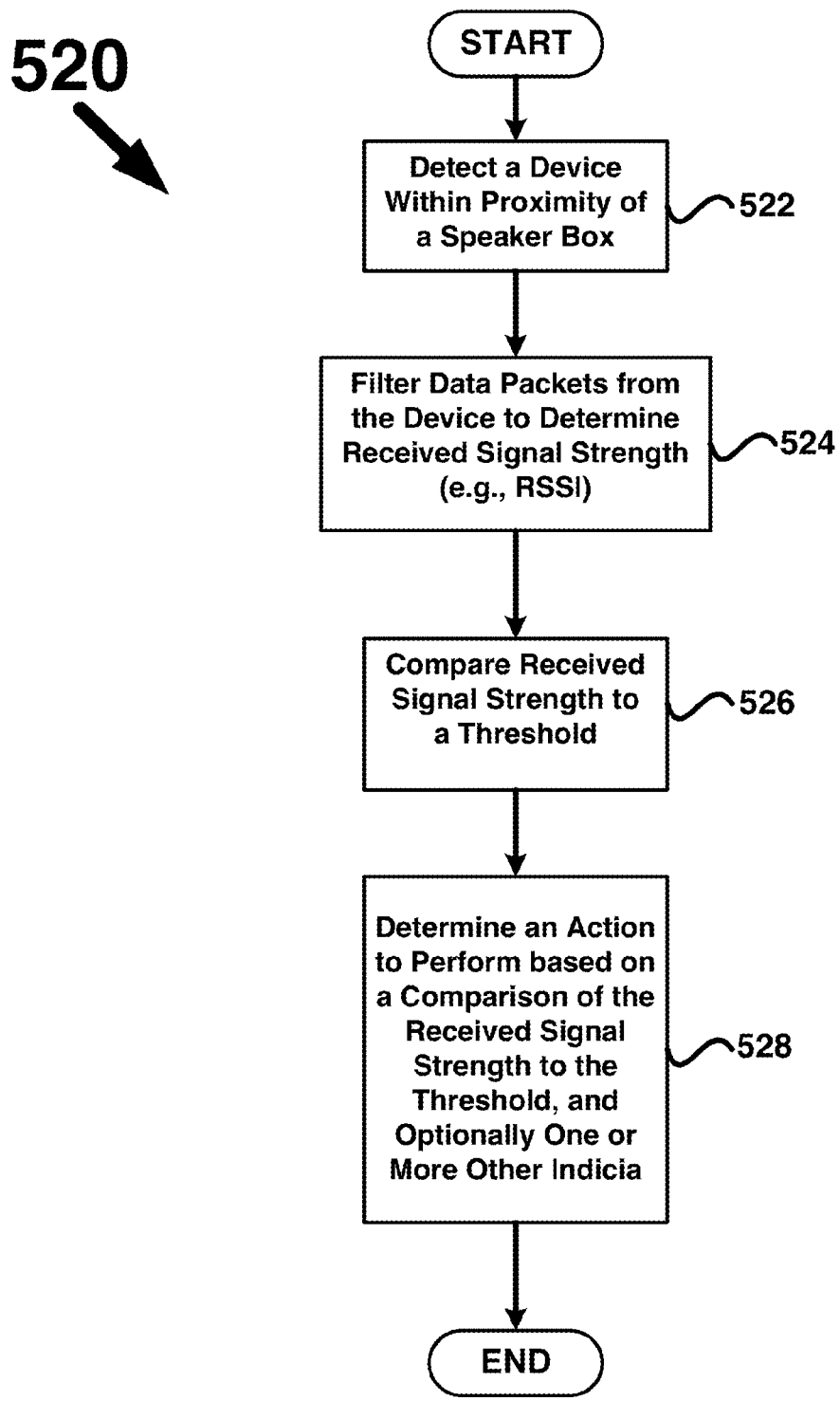
FIG. 5B illustrates an alternative exemplary process for proximity sensing device control architecture and data communication.

FIG. 5B illustrates an alternative exemplary process 520 for proximity sensing device control architecture and data communication. Process 520 may include a stage 522 where one or more devices (e.g., mobile devices 104, 112, 218, 232, 242, 318, 332, 342) may be detected in proximity of a speaker box (e.g., 102, 202, 302). Detection of the one or more devices may comprise using the RF system(s) and/or radio(s) of the speaker box (e.g., a RF receiver or RF transceiver in 102, 202, 302) to detect Received Signal Strength (e.g., RSSI), address (e.g., MAC address and/or Bluetooth address) from a RF signal being broadcast or otherwise transmitted by the one or more devices. Proximity may comprise near field proximity (e.g., as in proximity for NFC) of the one or more devices (e.g., at a distance, such as a few inches, within the enclosed region for threshold 106, 208, 308). Process 520 may include a stage 524 where data packets received from the one or more devices may be filtered to determine Received Signal Strength (e.g., RSSI) of the RF signal (e.g., as received by the speaker box 102, 202, 302) and the Received Signal Strength may be compared to a threshold value (e.g., threshold 106, 208, 308). Process 520 may include a stage 528 where a determination of an action to be performed based on the comparison of the Received Signal Strength (e.g., RSSI) to the threshold value (e.g., threshold 106, 208, 308) may occur. As described above, the determination of the action to be performed (e.g., streaming content, media, playback of music, video, etc., by speaker 108, 208, 308), if any, may be determined differently and is not limited to comparing Received Signal Strength (e.g., RSSI) values to a threshold value (e.g., 106, 208, 308). As described above in regards to stage 510 of FIG. 5A, one or more other indicia may optionally be considered as part of determining whether or not to take the action and will be described in greater detail below in reference to FIGS. 21-22. In some examples, control may be awarded manually or assigned based on a more complex algorithm that may or may not include using Received Signal Strength (e.g., RSSI) values or comparing those valued to some other metric such as the threshold (e.g., 106, 208, 308). As described above, another device in communication with the speaker box may perform one or more of the stages of process 520.

Figure 6:
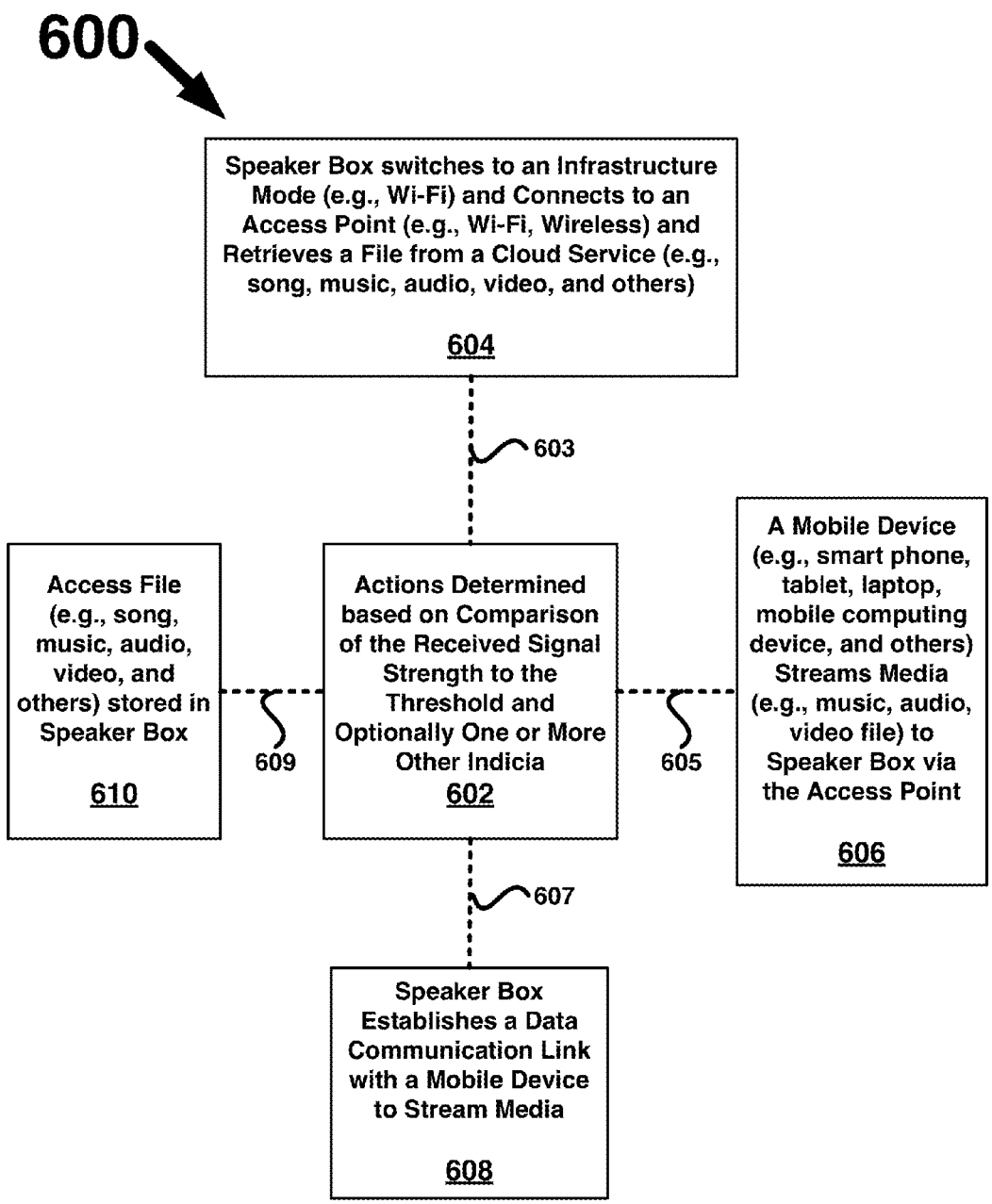
FIG. 6 illustrates exemplary actions determined using an exemplary proximity sensing device control architecture and data communication protocol.

FIG. 6 illustrates exemplary actions 600 that may be determined using an exemplary proximity sensing device control architecture and data communication protocol. In FIG. 600 at a stage 602 the Received Signal Strength (e.g., RSSI) value or values have been compared to the threshold (e.g., 106, 208, 308) and branches 603, 605, 607, and 609 lead to different stages at which specific actions may be taken. At the stage 602 one or more indicia may optionally be considered as part of the determination and those indicia will be described in greater detail below in reference to FIGS. 21-22. If a branch 603 is taken from the stage 602 to a stage 604, then the speaker box (102, 202, 302) may switch to an infrastructure mode (e.g., to WiFi) and connect to an access point (e.g., a WiFi or other type of wireless access point) and retrieve a file from a Cloud service (e.g., 110, 210, 310). The file may comprise data for a song, music, audio, video, and other forms of data, for example.

If a branch 605 is taken from the stage 602 to a stage 606, then a mobile device (e.g., 104, 112, 218, 232, 242, 318, 332, 342) may stream media to the speaker box via an access point (e.g., a WiFi or other type of wireless access point). The media being streamed may comprise without limitation music, audio, video, or other media file types.

If a branch 607 is taken from the stage 602 to a stage 608, then the speaker box may establish a data communications link with a mobile device (e.g., 104, 112, 218, 232, 242, 318, 332, 342) to stream media from the mobile device and/or from a location (e.g., an address) provided by the mobile device over the data communications link. The data communications link may comprise the data connections described above in reference to FIGS. 1-3C.

If a branch 609 is taken from the stage 602 to a stage 610, then a file stored in the speaker box may be accessed (e.g., by a mobile device). The file may comprise a song, music, audio, video or other file types, for example. As one example, the file may be stored in memory 206 of the speaker box. The stages 604, 606, 608 and 610 are non-limiting examples of actions that may be determined (e.g., at stages 510 or 528 of FIGS. 5A and 5B), and actual actions that may be determined may be application dependent, dependent on file types or content type, the type(s) of mobile devices, the types of wireless networks, the types of cloud services, just to name a few for example. In some examples, another device in communication with the speaker box may take the actions based on the determinations described above.

Figure 7:
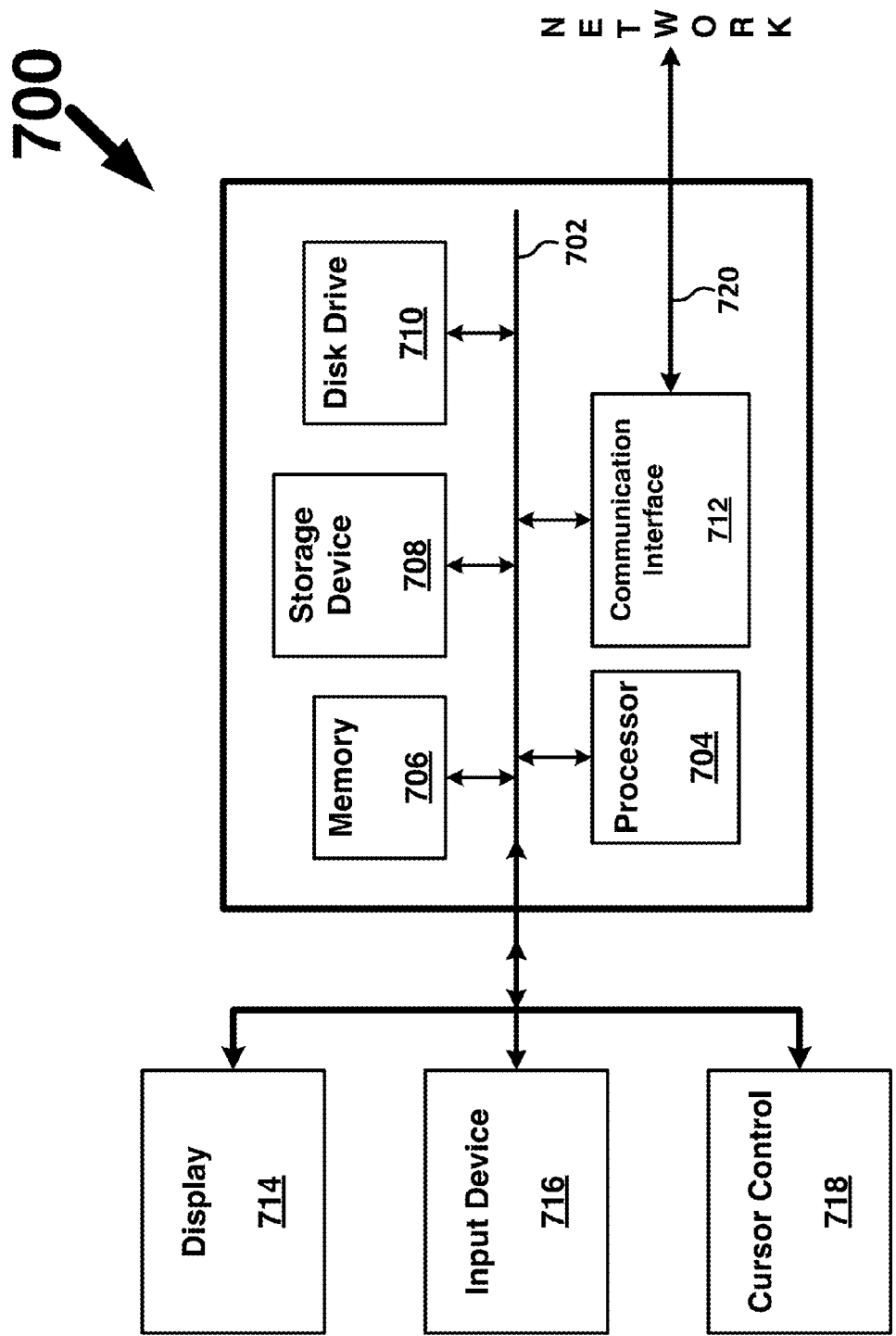
FIG. 7 illustrates an exemplary computer system suitable for use with proximity sensing device control architecture and data communication protocol.

FIG. 7 illustrates an exemplary computer system suitable for use with proximity sensing device control architecture and data communication protocol. In some examples, computer system 700 may be used to implement computer programs, applications, methods, processes, or other software to perform the above-described techniques. Computer system 700 includes a bus 702 or other communication mechanism for communicating information, which interconnects subsystems and devices, such as processor 704, system memory 706 (e.g., RAM), storage device 708 (e.g., ROM), disk drive 710 (e.g., magnetic or optical), communication interface 712 (e.g., modem or Ethernet card), display 714 (e.g., CRT or LCD), input device 716 (e.g., keyboard), and cursor control 718 (e.g., mouse or trackball).

According to some examples, computer system 700 performs specific operations by processor 704 executing one or more sequences of one or more instructions stored in system memory 706. Such instructions may be read into system memory 706 from another computer readable medium, such as static storage device 708 or disk drive 710. In some examples, hard-wired circuitry may be used in place of or in combination with software instructions for implementation.

The term "computer readable medium" refers to any tangible non-transitory computer readable medium that participates in providing instructions to processor 704 for execution. Such a medium may take many forms, including but not limited to, non-volatile media and volatile media. Non-volatile media includes, for example, optical or magnetic disks, such as disk drive 710. Volatile media includes dynamic memory, such as system memory 706.

Common forms of non-transitory computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other non-transitory medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 702 for transmitting a computer data signal.

In some examples, execution of the sequences of instructions may be performed by a single computer system 700. According to some examples, two or more computer systems 700 coupled by communication link 720 (e.g., LAN, PSTN, or wireless network) may perform the sequence of instructions in coordination with one another. Computer system 700 may transmit and receive messages, data, and instructions, including program, i.e., application code, through communication link 720 and communication interface 712. Received program code may be executed by processor 704 as it is received, and/or stored in disk drive 710, or other non-volatile storage for later execution.

The description that follows includes additional exemplary information illustrating various techniques and embodiments associated with an exemplary proximity sensing device control architecture and data communication protocol.

As described above and depicted by way of example in FIGS. 1-3B, threshold (106, 208, 308) may comprise a region surrounding a wireless device (e.g., speaker 102, 202, 302 and/or control device 204, 304) and one or more other wireless devices (e.g., mobile device(s) 104, 218, 318) where Received Signal Strength (e.g., RSSI) when compared to the threshold may provide a reliable indication that the transmitting and receiving devices are within sufficiently close near field proximity of one another (e.g., about 30 cm or less) for establishing a wireless link (e.g., Bluetooth (BT), WiFi, or other) and wirelessly communicating data over the wireless link. Each frequency that data may be wirelessly communicated over will typically have a predetermined frequency range and associated wavelength, such as the 2.4 GHz frequency, for example. Utilization of an antenna(s) in a RF receiver or transceiver in a radio or RF system of a device (e.g., 102, 202, 302 and/or control device 204, 304) that may be tuned or otherwise configured (e.g., detuned) to be non-resonant at the frequency of interest (e.g., WiFi or BT at 2.4 GHz or other) may be used ensure that radio performance is poor when the transmitting device(s) (e.g., smartphone, tablet, pad, mobile devices 104, 218, 318, etc.) are in a far field space (e.g., a space outside of the dashed lines for thresholds 106, 208, 308) relative to a position of the RF systems/radios of the receiving device(s) (e.g., 102, 202, 302 and/or control device 204, 304).

For example, with a distance between transmitter and receiver that is in a far field region (e.g., greater than about 0.5 meters) for a particular frequency band, in some example, the RSSI signal received by the receiver may be weaker for a de-tuned antenna than an antenna that is tuned and optimized for that particular frequency band. In the near field region, an antenna formed from a long wire having a specific layout structure, as will be described in greater detail below in regards to examples of such an antenna in FIGS. 8A-12 and 15-16, may be used to ensure maximum signal pickup of the near field RF signals of devices in different orientations (see FIGS. 14-16) and/or locations relative to the sensing device (e.g., the receiving device such as 102, 202, 302 and/or control device 204, 304) that includes the long wire with the specific layout. FIGS. 8A-11 depict non-limiting examples of an antenna that may be detuned to be non-resonant at a frequency of interest and coupled with a radio system of a device(s) such as those described in reference to FIGS. 1-3C above (e.g., device(s) 102, 202, 302 and/or control device 204, 304, or other device).

Figure 8A:
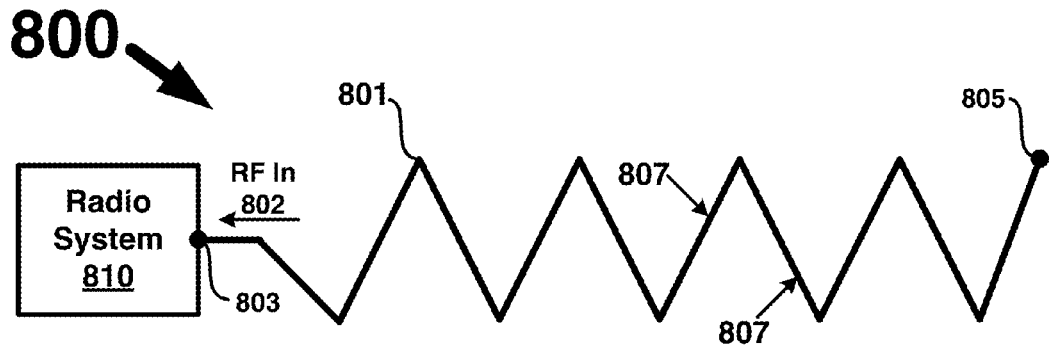
FIG. 8A depicts an example of an antenna that may be detuned to be non-resonant at a frequency of interest and coupled with a radio system.
Figure 8B:
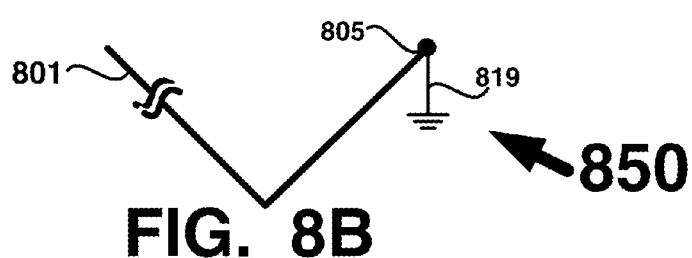
FIG. 8B depicts one example of an electrical termination of a node of an antenna.

Turning now to FIGS. 8A-8B, where example 800 of a radio system 810 (e.g., a radio receiver in a RF system of a device 102, 202, 302 and/or control device 204, 304, or other device) operating at an ultra-high frequency band including but not limited to BT, WiFi or other an operative to receive radio signal strength (e.g., RSSI) from a transmitting device (e.g., smartphone, tablet, pad, mobile devices 104, 218, 318, etc.), may include an antenna 801 made from a wire or other electrically conductive structure (e.g., electrically conductive trances on a PCB or flexible PCB) and having a predefined length. A first end 803 of the antenna 801 may be electrically coupled with an input 802 of radio system 810 (e.g., electrically coupled with one or more RF receivers or RF transceivers) and a second end 805 of the antenna 801 may be un-coupled (e.g., electrically un-coupled as an open circuit) as depicted in FIG. 8A, or may be coupled with a potential, such as a ground (e.g., short-circuited) as depicted in example 850 of FIG. 8B where the second end 805 is coupled to a ground 819. Wire for antenna 801 may include a plurality of sections 807 having different orientations relative to one another including but not limited to a zig-zagged pattern depicted in example 800 of FIG. 8A. Each section 807 may oriented relative to an adjacent sections by a bend (e.g., at approximately 90 degrees, approximately 45 degrees, or some other angle).

Figure 9A:
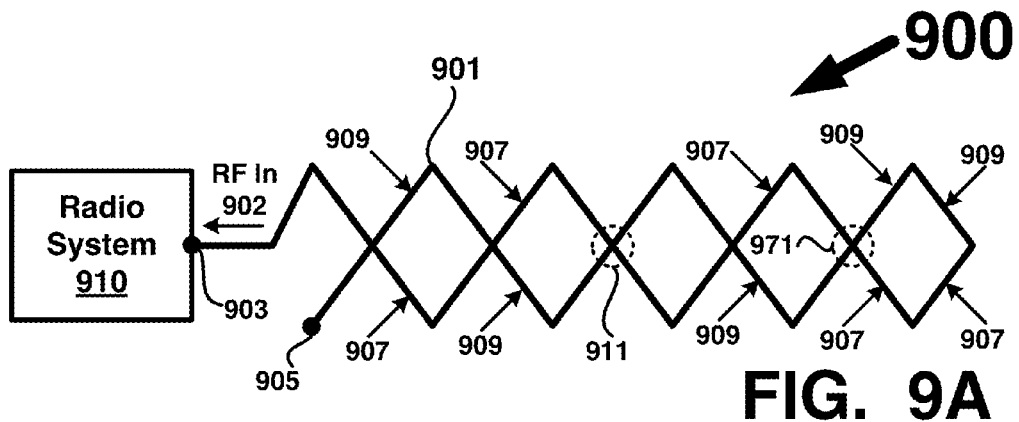
FIG. 9A depicts another example of an antenna that may be detuned to be non-resonant at a frequency of interest and coupled with a radio system.
Figure 9B:
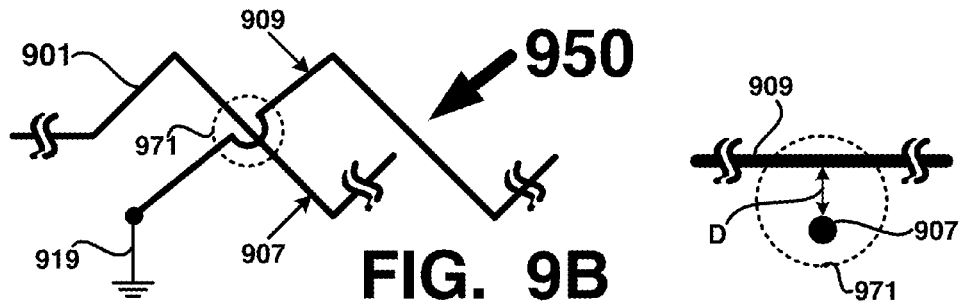
FIG. 9B depicts another example of an electrical termination of a node of an antenna.

Referring now to FIGS. 9A-9B, where example 900 depicts a radio system 910 operating at an ultra-high frequency band and having its input 902 coupled with a first end 903 of an antenna 901 made from a wire or other electrically conductive structure and having a predefined length. A second end 905 of the antenna 901 may be un-coupled (e.g., an open circuit) as depicted in FIG. 9A, or may be coupled to a potential, such as a ground (e.g., short-circuited) as depicted in example 950 of FIG. 9B where the second end 905 is coupled to a ground 919. Antenna 901 may include a plurality of sections 907 and 909 having different orientations relative to one another including but not limited to a zig-zagged pattern depicted in example 900 of FIG. 9A., with sections 907 extending along a direction away from first end 903 and sections 909 folding back and extending in a direction towards the second end 905. Each section (907, 909) may oriented relative to an adjacent sections by a bend (e.g., at approximately 90 degrees, at approximately 45 degrees, or some other angle). In FIG. 9A, dashed circle 971 denotes that sections 907 and 909 at their respective points of crossing over each other are not electrically connected at the cross over point, as depicted in greater detail in FIG. 9B where inside the dashed circle 971 section 909 although part of the same antenna 901 is not in contact with section 907. In FIG. 9B, the sections 909 (e.g., running left-to-right) and 907 (e.g., into the drawing sheet) proximate the point 971 of crossing over each other may be spaced apart a distance D from each other so as not to make contact with each other. An air gap between the sections (909, 907), an electrically insulating material on a portion of one or both sections (909, 907) or the like may be used to prevent electrical contact between the sections (909, 907). As one example, sections 907 may be electrically conductive traces or wires on a first level and sections 909 as they fold back may be electrically conductive traces or wires on a second level that is above or below the first level. As another example, sections 907 may be conductive traces on a first layer of a PCB or flexible PCB and sections 909 may be conductive traces on a second layer of the PCB or flexible PCB that is spaced apart from and electrically isolated from the first layer.

Figure 10:
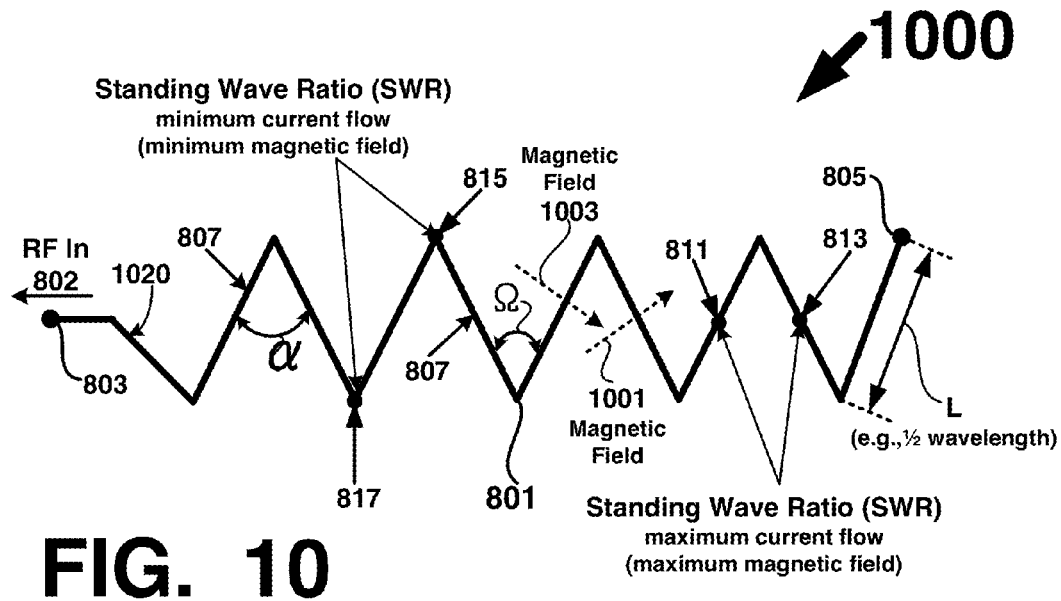
FIG. 10 depicts an example of an antenna that may be detuned to be non-resonant at a frequency of interest.
Figure 11:
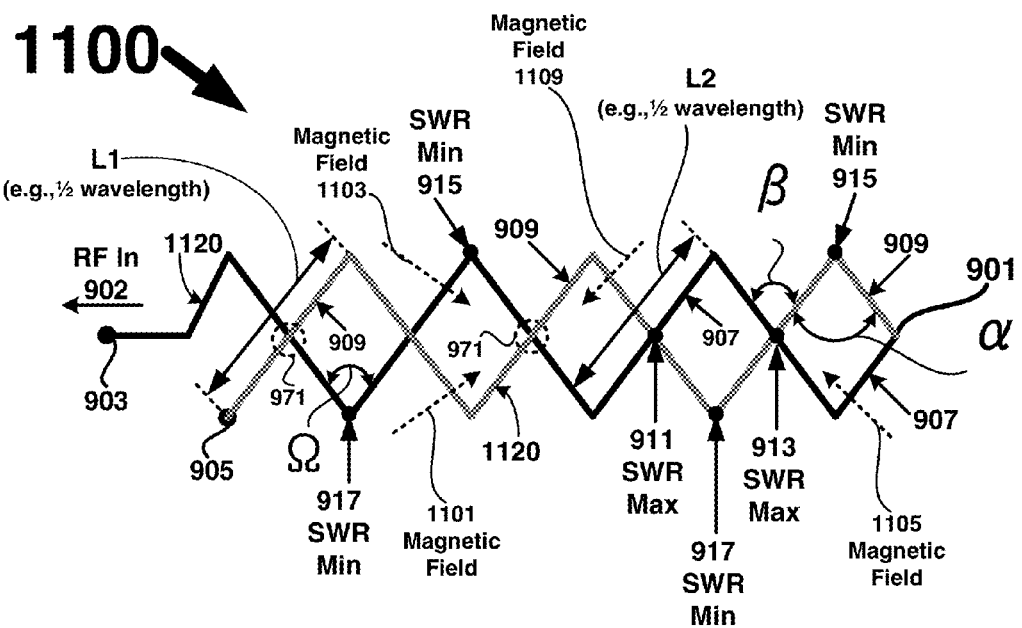
FIG. 11 depicts another example of an antenna that may be detuned to be non-resonant at a frequency of interest.

Moving on to FIGS. 10 and 11, in FIGS. 8A and 9A the zig-zagged patterns of antennas (801, 901) may provide better coverage of a magnetic field in a RF signal (e.g., electromagnetic (EM) wave) being transmitted by one or more transmitting devices. In FIGS. 10 and 11, each section (907, 909) may have a length (L, L1, L2) (e.g., its electrical length) including but not limited to an electrical length that may be: approximately one or more multiples of a quarter-wavelength of the frequency of interest (e.g., BT, WiFi, 2, 4 GHZ, etc.); approximately one-half (½) a wavelength of the frequency of interest; approximately one or more multiples of one-half (½) a wavelength of the frequency of interest; an arbitrary fraction of a wavelength of the frequency of interest; and may be set to be greater than a wavelength of the frequency of interest (e.g., electrical length >1λ where λ=wavelength), for example. Setting the electrical length may be used to ensure that a magnetic field strength of a magnetic field (1001, 1003, 1103, 1105) in the transmitted RF signal is at a maximum magnetic field strength at a center (811, 813, 911, 913) of each section (907, 909). Lengths (L, L1, L2) of sections (807, 907, 909) may be varied along a length of the zig-zag of their respective antennas (801, 901) to shift where the magnetic field strength lies along the wire for those antennas (801, 901). In the examples, 800, 900, 1000, and 1100 of FIGS. 8A-11, a device (e.g., 102, 202, 302 and/or control device 204, 304, or other device) may not have a ground plane (not shown) (e.g., an electrically conductive surface that is either electrically coupled with an electrical ground and/or has a large surface area relative to the wavelength of the antenna 801, 901) that is in close proximity to the wires for antennas (801, 901) which may affect performance of the magnetic fields (1001, 1003, 1103, 1105). A standing wave ratio (SWR) of the RF signal being received by the antenna (801, 901) may be a maximum at the centers (811, 813, 911, 913) of each section (907, 909) and a current flow generated by the RF signal may be a maximum at the centers (811, 813, 911, 913). In contrast, the SWR may be minimum with a minimum magnetic field and a minimum current flow at points 815, 817, 915, 917) of each section (907, 909). In FIG. 11, lengths L1 and L2 may have different lengths or may have identical lengths (e.g., electrical lengths) for sections 907 and 909. Further, in antenna 901, L1 may vary among the sections 909 and L2 may vary among the sections 907. In FIG. 10, length L (e.g., electrical lengths) may be the same or different among the sections 807 of antenna 801.

Actual shape, pattern and length (e.g., zig-zagged or other) of the antenna (801, 901) will be application dependent and are not limited to the exampled depicted herein. For example, the antenna (801, 901) may have a length determined by a frequency band of the wireless devices that will be transmitting the RF signal (e.g., a BT or WiFi device or other). A dimension and/or shape of a chassis or enclosure the antenna (801, 901) is mounted on, mounted in, enclosed by, carried by or otherwise coupled with may determine a length of the antenna (801, 901). Angles between sections may also be application dependent and are not limited by the examples depicted herein. As one example, an angle α and an angle Ω between sections 807 of FIG. 10 may be the same or different angles and may not be approximately 90 degree angles (e.g., may be approximately 45 degrees or some other angle). Similarly, angles α, Ω and β between sections 909 and 907 of FIG. 11 may be the same or different angles and the angle may not be approximately 90 degree angles (e.g., approximately a right angle). The zig-zagged shape for antennas (801, 901) depicted as examples in FIGS. 8A-11, are non-limiting examples and other shapes may be used. Furthermore, sections (807, 907, 909) need not be joined at points or an apex as depicted in FIGS. 8A-11 and other configurations may be used such as depicted in antennas 1201 and 1231 of FIGS. 12A and 12B, for example.

Advantages of using the example antennas (801, 901) described above in reference to FIGS. 8A-11 include but are not limited to: freedom in positioning the long wire for the antenna (801, 901) for near field sensing (e.g., within threshold 106, 208, 308) to cover an area for sensing on a product (e.g., a wireless device, a client device, device(s) 102, 202, 302 and/or control device 204, 304, or other device); placement of the antenna (801, 901) to cover areas where the object is obstructive compared to conventional antennas that may have to be strategically placed in order to be effective at receiving near field transmissions from other devices; flexibility in using arbitrary sized metal structures for sensing using the antenna (801, 901); NFC for proximity sensing is not necessary in the device using the antenna (801, 901); the antenna (801, 901) is not limited to the area for sensing; and a reduction in cost with respect to conventional antennas for sensing (e.g., multiple conventional antennas needed for sensing different orientation and position of transmitting devices to be sensed), for example.

The example antennas (801, 901) described above in reference to FIGS. 8A-11 may be utilized in a variety of end use scenarios including but not limited to: utilizing the detuned antennas (801, 901) for high frequency sensing (e.g., in the GHz region of the RF spectrum, such as 2.4 GHz or other high frequency bands) to degrade RSSI signals received from other wireless devices operating (e.g., transmitting RF signals in the targeted high frequency band) in the far field (e.g., outside of threshold 106, 208, 308); utilize the long wire configuration of the antenna (801, 901) to compensate for weaker magnetic field strength along sections of the wire; and utilizing a metal structure (e.g., a metal wall casing) of the receiving sensing device (e.g., a wireless device, a client device, device(s) 102, 202, 302 and/or control device 204, 304, or other device) as the electrically conductive material for the non-resonating structure (801, 901) at the frequency band of interest (e.g., 2.4 GHz or other) for near field sensing of a transmitting device(s), for example.

Near field sensing of RF transmitting devices is not limited to devices depicted herein and may be implemented in other products and devices such as smartphones, laptops, and other non-obvious objects with radio capabilities. As one example, in a home WiFi environment where lamps may be enabled with radio devices, a metal poll structure of the lamp may be configured to act as a sensor by incorporating the antenna (801, 901) into the metal structure. Bringing a RF enabled device that is transmitting RF signals (e.g., a smartphone) close to the lamp may cause the lamp to sense the RF enabled device and automatically switch from ON to OFF or from OFF to ON, or to control dimming of the lamp, for example. Secure access to a structure such as a building or other may a metal structure (e.g., a metal door frame or other) that acts as the non-resonating antenna (801, 901) at the frequency band of interest, where a smartphone (or other radio device) is sensed in the near field of the structure to allow access to the structure. A surface, such as a tabletop, may include the antenna (801, 901) to sense the presence (e.g., in the near field) of other wireless devices. The foregoing are non-exhaustive examples of uses for the antenna (801, 901).

Figure 12A:
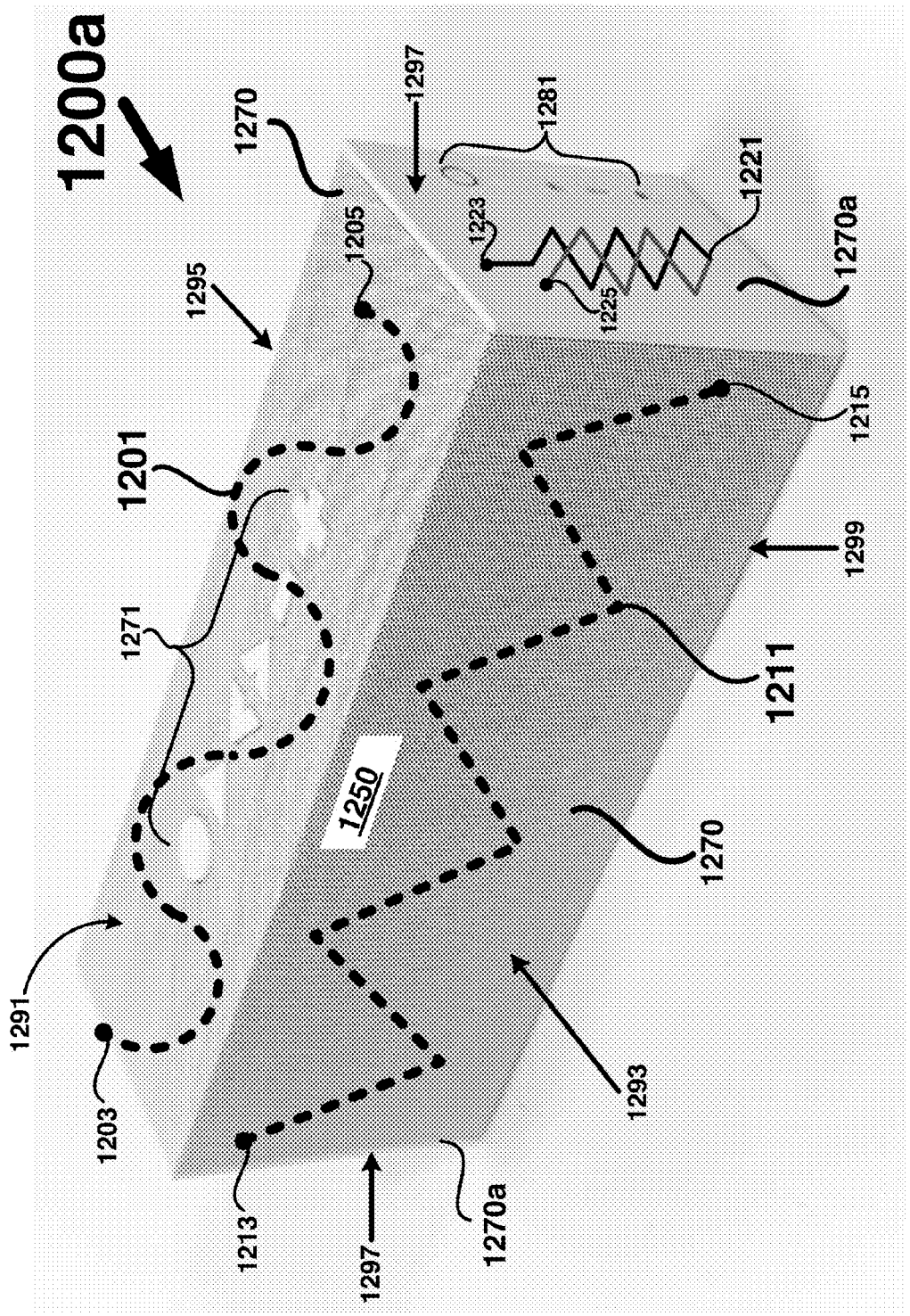
FIG. 12A depicts an example of a chassis for wireless device and also depicts examples of different exterior and interior positions for one or more antennas that may be detuned to be non-resonant at a frequency of interest.

Description is now directed to FIG. 12A where an example 1200a of a chassis for wireless device 1250 is depicted and examples of different exterior and interior positions for one or more antennas 1201, 1211 and 1221 that may be detuned to be non-resonant at a frequency of interest are also depicted. Here, device 1250 may include a portion 1270 that may be electrically conductive (e.g., a metal chassis and/or grill for a speaker—not shown) and a portion 1270a that may be electrically non-conductive (e.g., a plastic or other material). A chassis of device 1250 may include one or more antennas one or more antennas 1201, 1211 and 1221 that may be detuned to be non-resonant at a frequency of interest, such as frequencies (e.g., BT, WiFi, etc.) used by wireless devices (e.g., smartphones, laptops, pads, tablets, gaming devices, wireless routers, etc.). Antenna 1201 may be located on a top surface 1291 of device 1250 and may be positioned beneath the top surface 1291 as denoted by the dashed line for antenna 1201. A first end 1203 of the antenna 1201 may be electrically coupled with a RF system (not shown) of device 1250 in a manner similar to first ends (803, 903) of antennas (801, 901) described above in FIGS. 8A and 9A. Second end 1205 may be un-coupled (e.g., open circuit) or coupled to a potential (e.g., a ground) in a manner similar to second ends (805, 905) of antennas (801, 901) described above in FIGS. 8B and 9B. Antenna 1250 may be routed around structure included in device 1250 such as device controls 1271. A shape of antenna 1201 may be arcuate along its length (e.g., sinusoidal or wave shaped); however, antenna 1201 may have other shapes and is not limited to the shape depicted. Device 1250 may include antenna 1211 located on a front surface 1293 of the device 1250 and positioned beneath the front surface 1293 as denoted by the dashed line for antenna 1211. First and second ends (1213, 1215) may be coupled as described above for antenna 1201. A shape of antenna 1211 may be zig-zagged along its length as depicted or may have some other shape. Device 1250 may include antenna 1221 located on a side surface 1297 of the device 1250 and positioned on the side surface 1297 (e.g., an electrically non-conductive material) as denoted by the solid line for antenna 1221. First and second ends (1223, 1225) may be coupled as described above for antenna 1201. A shape of antenna 1221 may be zig-zagged and folded back along its length as depicted or may have some other shape. Device 1250 may include one or more antennas that may be detuned to be non-resonant at a frequency of interest, such as one or more of antennas 1201, 1211, or 1221, for example. A plurality of antennas may be used to provide multiple locations upon which to physically place or to position in near field proximity other RF transmitting wireless devices (e.g., mobile devices, smartphones, etc.) to be sensed as described above. Device 1250 may include antennas in one or more other positions than those depicted, such as on a rear surface 1295, or a bottom surface 1299, for example. In other examples, antennas 1201, 1211 may not be positioned below surfaces 1291 and 1293. A plurality of antenna (1201, 1211, 1221) may be electrically coupled with the same or different RF systems and/or radios the device 1250.

Figure 12B:
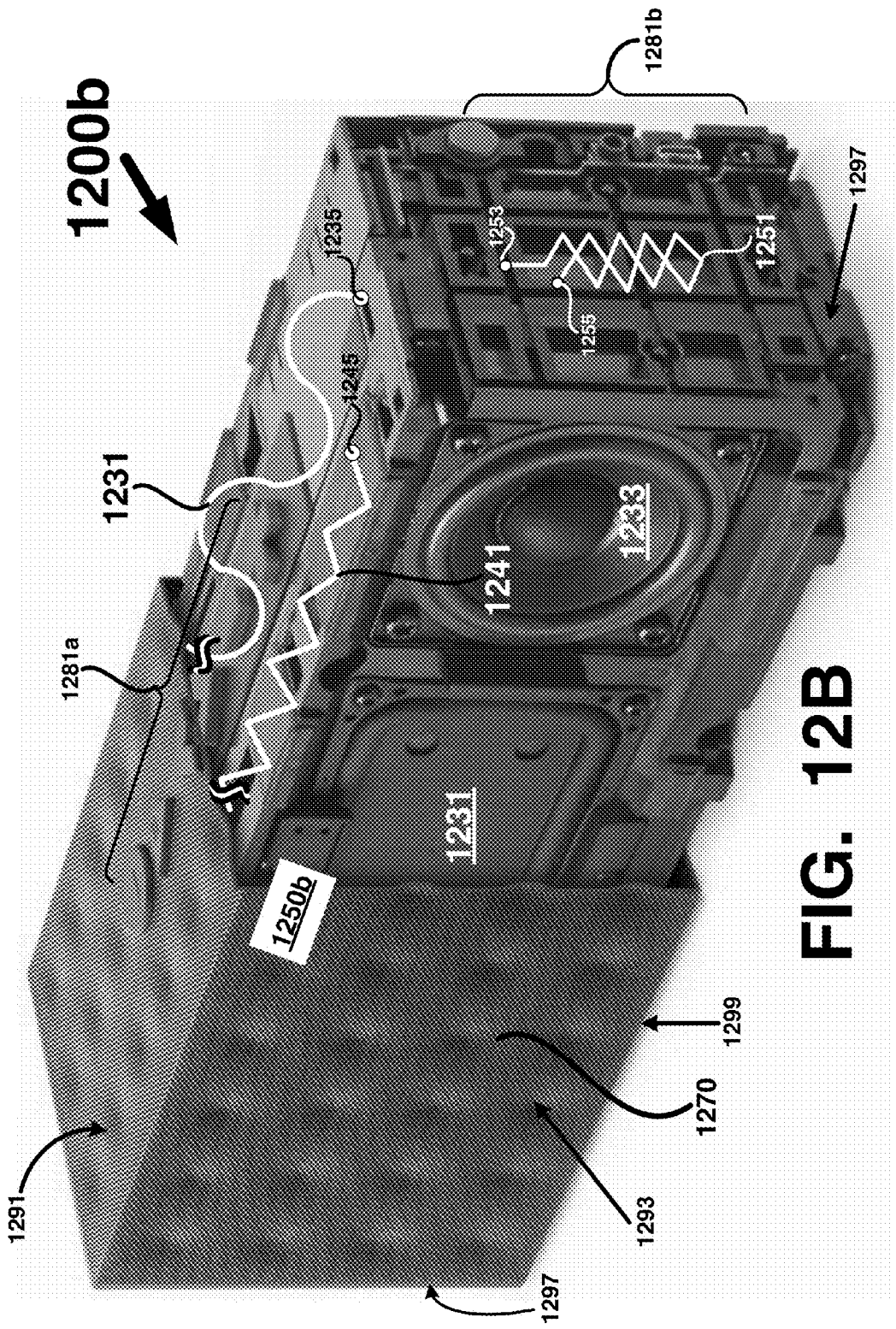
FIG. 12B depicts a partial cut-away view of an example of a chassis for wireless device and also depicts examples of different positions for one or more antennas that may be detuned to be non-resonant at a frequency of interest.

Turning now to FIG. 12B where a partial cut-away view of an example of a chassis for wireless device 1250*b* is depicted and examples of different positions for one or more antennas 1231, 1241, and 1251 that may be detuned to be non-resonant at a frequency of interest are also depicted. Device 1250*b* may be a speaker box (e.g., 102, 202, 302) having one or more speakers 1231 and/or 1233 for playback of content and/or media, such as music, etc., for example. Here a top surface 1291 of device 1250*b* may include an antenna 1231 and/or an antenna 1241 which may have lengths that span across the top surface such that an entire length of those antennas are not shown. Antennas 1231 and 1241 may have different lengths and/or dimensions. Antennas 1231 and 1241 may have different shapes as depicted or may have the same shape. Antenna 1231 may be routed around control elements 1281*a* (e.g., volume up/down, playback controls). Device 1250*b* may include an antenna 1251 positioned on a side surface 1297 adjacent to control and interface structures 1281*b*. Antenna 1251 may have a zig-zagged and folded back shape or some other shape. First and second ends of the antennas depicted in FIG. 12B may be coupled or otherwise terminated as described above, with the first ends electrically coupled with RF systems and/or radios and the second ends either open-circuited or coupled to a potential, such as ground, for example. In some examples, the antennas depicted in FIG. 12B may be positioned differently; such as not beneath structure 1270 of device 1250*b*. For example, if structure 1270 is electrically non-conductive, then one or more of the antennas (1231, 1241, 1251) may be positioned on or formed in materials for structure 1270. Device 1250*b* may include one or more of the one or more antennas 1231, 1241, and 1251 and those antennas may be electrically coupled to the same or different RF system. In FIGS. 12A and 12B, the antennas depicted may be detuned to be non-resonant at the same or different frequencies of interest.

Referring now to FIG. 13 where examples 1300*a* and 1300*b* of connectors that may be used to electrically couple an antenna 1301 that may be detuned to be non-resonant at a frequency of interest with circuitry of a RF system (e.g., a WiFi and/or BT radio) is depicted. A first end 1303 of antenna 1301 may be coupled with a connector, such as a male SMA connector or other type of connector. A RF system 1310 may be disposed on a substrate such as a PCB or semiconductor die and may be coupled 1301*c* with a connector 1321, such as a female SMA connector or other type of connector (e.g., BNC). Here, a male pin 1322*m* on the connector 1320 may be configured to mate with a female receptacle 1323*f* (not shown) on connector 1321 when the two connectors are joined (e.g., via threads on the connectors). The first end 1303 may be crimped or soldered to a node on the connector 1320 that is electrically coupled with male pin 1322*m*. In example 1300*b*, the connectors (1320, 1321) are depicted after being connected 1350 (e.g., by screwing 1320 onto threads of 1321) to each other such that antenna 1301 is electrically coupled with RF system 1310. Other types of connectors, male, female, or otherwise may be used and the foregoing are non-limiting examples. In other examples, soldering or crimping may be used to couple first end 1303 with an input to a RF system. Wire for antenna 1301 may be unshielded, or may include shielding along a portion of the wire, such as a portion 1305 adjacent to connector 1320. The shielding may be coaxial and may have a 50 ohm impedance or other impedance (e.g., 75 ohms, etc.), for example.

Figure 15:
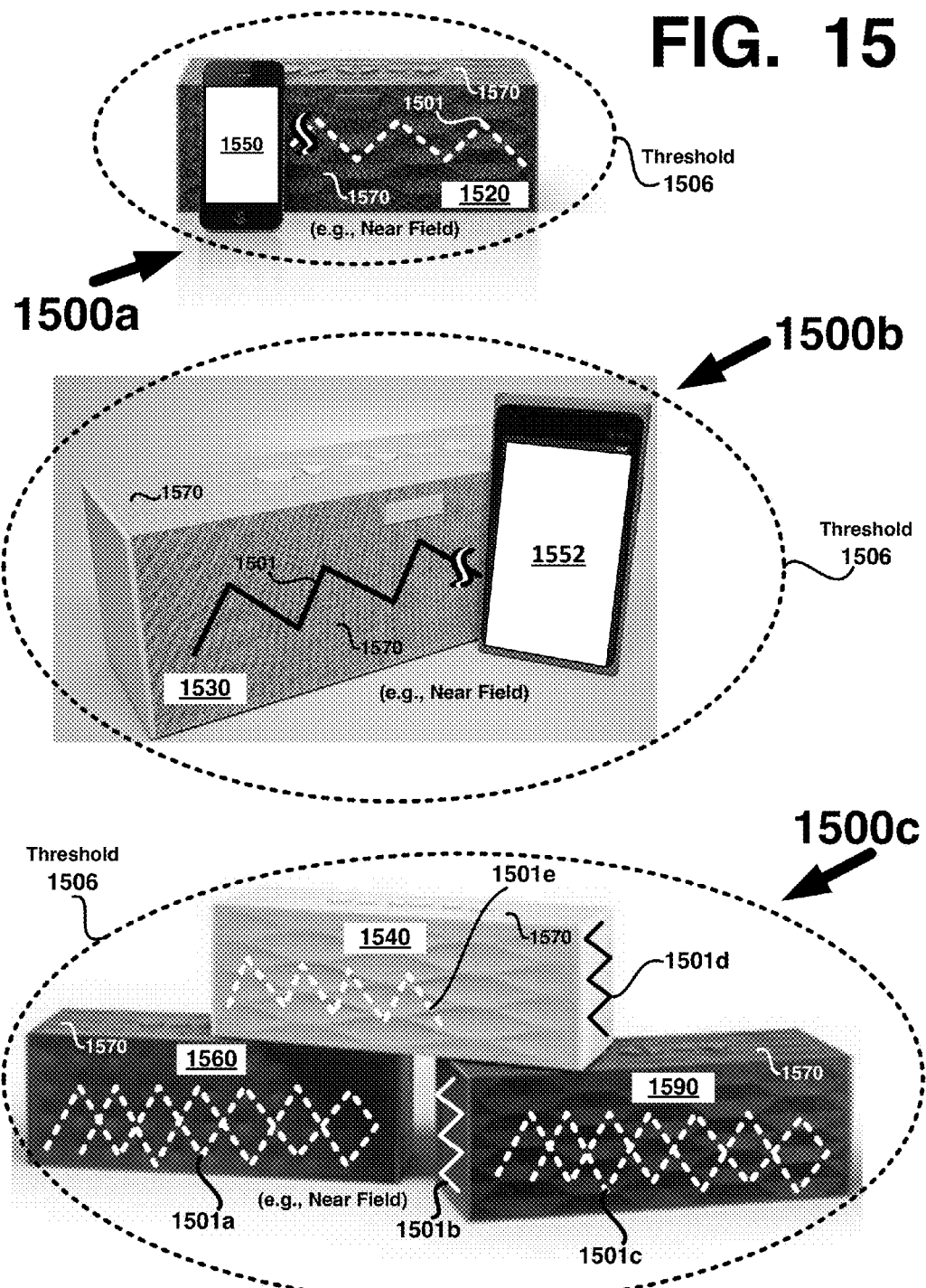
FIG. 15 depicts examples of different types of wireless client devices in near-field proximity of a wireless device including one or more antennas that may be detuned to be non-resonant at a frequency of interest.

Returning to FIG. 12B, device 1250*b* using one of its antennas, such as antenna 1231 for example, may be operative to sense RSSI from a first device (not shown, but see devices 1540 and 1650 in examples 1500*c* and 1600*a* in FIGS. 15 and 16) placed on top of the device 1250*b* (e.g., on surface 1291). The RSSI from the first device may be high with the first device placed in any orientation so long as the first device is close by in the near field region (e.g., threshold 106, 208, 308) of device 1250*b*. The RSSI being within a threshold value or being compared to a threshold value may be used by the device 1250*b* to take some action (e.g., handling of content or some other action to be performed as described in reference to FIGS. 5A-6). If the first device is replaced by a second device (not shown), the device 1250*b* may detect the RSSI of the second device and handover operation (e.g., handling of content or taking some action to be performed as described in reference to FIGS. 5A-6). In FIG. 12B, the wire for antenna 1231 may be several wavelengths long at the frequency of interest (e.g., 2.4 GHz or other). The antenna 1231 may have a resonant frequency that is lower than the frequency of interest (e.g., lower than 2.4 GHz). As one example, with a particular electrical length, antenna 1231 may resonate in the 100 MHz range. In some examples, antenna 1231 resonating in the 100 MHz range or some other frequency range may create harmonics at multiples of the resonating frequency. To ensure that those harmonics do not fall within the range of the frequency band that forbids WiFi transmission activities (e.g., GPS or other frequency bands), the antenna 1231 may be tuned to avoid harmonics that fall within those frequency ranges.

Figure 14:
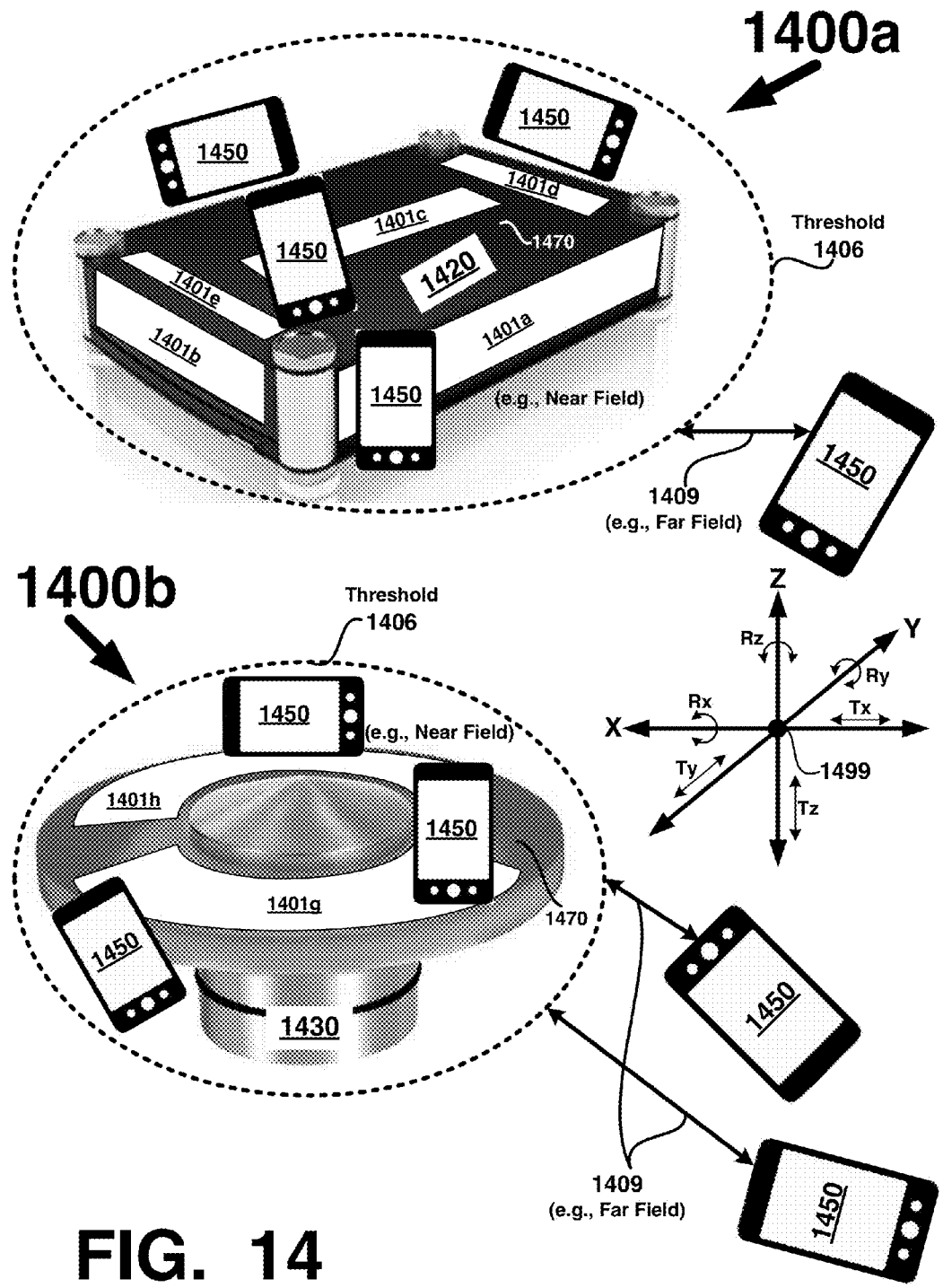
FIG. 14 depicts examples of different types of enclosures for a wireless device that may include one or more antennas that may be detuned to be non-resonant at a frequency of interest and wireless client devices having different near-field and far-field orientations relative to those antennas.

Advancing now to FIG. 14 where examples 1400*a* and 1400*b* of different types of enclosures for a wireless device (1420, 1430) that may include one or more antennas that may be detuned to be non-resonant at a frequency of interest and wireless client devices 1450 having different near-field and far-field orientations relative to those antennas are depicted. In example 1400*a*, wireless device 1420 may include an enclosure having a substantially rectangular shape with pillars or footings positioned at all four corners of the enclosure. One or more antennas 1410*a*-1401*e* may be positioned at different locations on and/or in the enclosure for device 1420. A surface 1470 of the enclosure may be electrically conductive and may be operative as an antenna or may be electrically non-conductive and the antenna may be formed in or on the electrically non-conductive material for 1470. One or more wireless client devices 1450 may be positioned within threshold 1406 of device 1420 (e.g., within near field proximity) so that transmitted RF signals from those one or more devices 1450 may have RSSI or other RF signal data sensed by a RF system of device 1420 using the one or more antennas 1410a-1401e. The one or more wireless client devices 1450 may be placed in direct contact with device 1420 (e.g., on surface 1470). Wireless client devices 1450 may have their RSSI or other RF signal data sensed with the wireless client devices 1450 disposed in different orientations relative to device 1420 as depicted in example 1400a. In that antennas for wireless client devices 1450 may have different radiation patterns and/or signal strengths that vary with orientation of the wireless client device 1450, while within threshold 1406, the RSSI may be sensed regardless of the orientation of the wireless client devices 1450. On the other hand if the one or more devices 1450 are positioned outside threshold 1406 at a far field distance 1409, then RSSI received by device 1420 using its one or more antennas 1410a-1401e may be insufficient (e.g., below a threshold value) to trigger an action being taken by device 1420. Here orientation may be wireless client device having an orientation relative to some point of reference, such as X-Y-Z system 1499 where Tx, Ty, Tz, Rx, Ry, and Rz denote translations and rotations respectively about the X-Y-Z axes of X-Y-Z system 1499. X-Y-Z system 1499 may be referenced to a point on device 1420. Any orientation of device 1450 in the far field 1409 should not trigger false sensing of device 1420, that is, RSSI or other RF data being sensed from 1450 when positioned in the far field 1409 is not sufficient to trigger action from 1420; whereas, any orientation of device 1450 within the near field denoted by threshold 1406 should have RSSI that is sensed as being in the threshold 1406 and may trigger an appropriate action be device 1420, such as described above in reference to FIGS. 5A-6.

Example 1400b depicts another configuration for a chassis shape and placement of one or more antennas 1410g-1401h on the chassis for device 1430. Here, as in example 1400a, wireless client devices 1450 while within threshold 1406 may have any orientation or be placed directly in contact with device 1430 for emitted RSSI to be sensed as being in the near field. When outside the threshold 1406 at the far field 1409, orientation and/or position of the device(s) 1450 may be sensed by device 1420 as having RSSI that is not consistent with a near field location and no action may be taken by device 1430 relative to the far field devices that are sensed with below threshold value RSSI.

FIGS. 15-16 depict examples 1500a-1600b of different types of wireless client devices in near-field proximity of a wireless device including one or more antennas that may be detuned to be non-resonant at a frequency of interest. In FIGS. 15-16 the wireless client devices may have different orientations relative to the wireless devices they are in near field proximity of. In example 1500a of FIG. 15, wireless device 1520 includes antenna 1501 positioned at a front surface and a wireless client device 1550 is positioned within threshold 1506 and is resting against the front surface of device 1520. In example 1500b, wireless client device 1552 is within threshold 1506 of wireless device 1530 and is positioned adjacent to a front surface of the device 1530 that includes antenna 1501. In example 1500c, a plurality of client devices 1590 and 1560 are positioned within a threshold of wireless device 1540 that includes an antenna 1501d on a side surface and an antenna 1501e on a front surface. Wireless client devices (1590, 1560) are positioned below and in contact with wireless device 1540 and have different orientations relative to wireless device 1540. RSSI transmitted by wireless client devices (1590, 1560) may be sensed by wireless device 1540 as being in the near field. Wireless client devices (1590, 1560) may be configured similarly to device 1540 (e.g., 1590 and/or 1560 may be speaker boxes like wireless device 1540). Wireless client devices (1590, 1560) may include their own antennas (1501a, 1501b, 1501c) that may be detuned to be non-resonant at a frequency of interest (e.g., 2.4 GHz) and that frequency of interest may be the same or different than that for the antennas (1501d, 1501e) for device 1540, for example. In some example, one or more of the devices 1540, 1560, 1590 may be a wireless device and one or more the devices may be wireless client devices. For example, if device 1590 is a wireless device listening (e.g., using its RF system to receive RSSI from transmitting devices) for wireless client devices and device 1540 is moved from the far field into threshold 1506 and near field proximity of wireless device 1590, then wireless device 1590 may regard device 1540 as a wireless client device and take some action with regard to content, data, media or other when device 1540 is placed on top of device 1590. Moving device 1560 from the far field into threshold 1506 may result in device 1590 and/or device 1540 regarding the newly introduced device 1560 as wireless client device and devices 1590 and/or 1540 may take appropriate actions. As one example, the action taken may be to have content from device 1540 that was being played back on speakers of device 1590 to be played back in stereo using the speakers of devices 1590 and 1560.

In FIG. 16, example 1600a depicts a wireless client device 1650 positioned within threshold 1606 and on top of and in direct contact with a wireless device 1620 that includes antenna 1601. RSSI transmitted from client device 1650 will be sensed as being in the near field even if device 1650 is rotated 1611 by 180 degrees (e.g., flipped over such that the screen is face down on device 1620) or some other angle relative to wireless device 1620. In example 1600b, client device 1650 is positioned within threshold 1606 on a side of wireless device 1630 having antennas 1601a and 1601b, with antenna 1601b being disposed on the side of device 1430 proximate the wireless client device 1650. Here, RSSI transmitted from client device 1650 will be sensed as being in the near field even if device 1650 is twisted 1621 by 180 degrees (e.g., spun around such that the screen is facing the side of the device 1630) or some other angle relative to wireless device 1630.

In the examples depicted in FIGS. 15 and 16, the number and placement of antennas on the wireless devices relative to the position and orientation of the wireless client devices may still allow for received RSSI to be sensed as being in the near field and appropriate action may be taken by the wireless devices relative to content, media, or other data carried by or accessible by the wireless client devices. Actual distances and/or ranges associated with near field, near field region, far field, far field region may be application specific and are not limited by the examples described and/or depicted herein. Actual shapes and span (e.g., distance around devices 102, 202, 204, 302, 304, etc.) of the threshold (106, 208, 308, etc.) may be application dependent and are not limited by the examples described and/or depicted herein.

To the extent possible, it is desirable for users of media devices, consumer electronic devices and other types of electronic devices in widespread use by consumers to be as easy to use and interact with as possible. To that end, bringing a wireless client device in close enough proximity (e.g., in the near field within the threshold 106, 208, 308, etc.) to the device having the antenna as described above in reference to FIGS. 8A-16 needs to be as simple and error free as possible for the user. Ideally, the user need only perform the same action each time and obtain a predictable result (e.g., the device taking an action as described in FIGS. 5A-6) that provides for a seamless user experience. One example of an action the user may consistently perform to get that predictable result and experience the seamless user experience is to position one or more wireless client devices in direct contact with (e.g., resting on a predetermined portion of a chassis or housing of the device) the device, without having to orient those client devices in any specific way in order for RF transmissions from those devices (e.g., pinging data packets, etc.) to be received by the device with sufficient signal strength (e.g., received signal strength, RSSI, dBμV/m, dBmV/m, or other measure) to determine the wireless client device is within the threshold (106, 208, 308, etc.) and/or is in direct contact with the device as will be described below. Basically, it is desirable for the user to know exactly what to do in order to have some action taken by the device relative to the user's wireless client device(s) and to make that user action as simple and straight forward as possible; in short, it ought to be easy for the user to get a predictable and repeatable result without having to fuss over client device orientation when placed in contact with the device.

Figure 17:
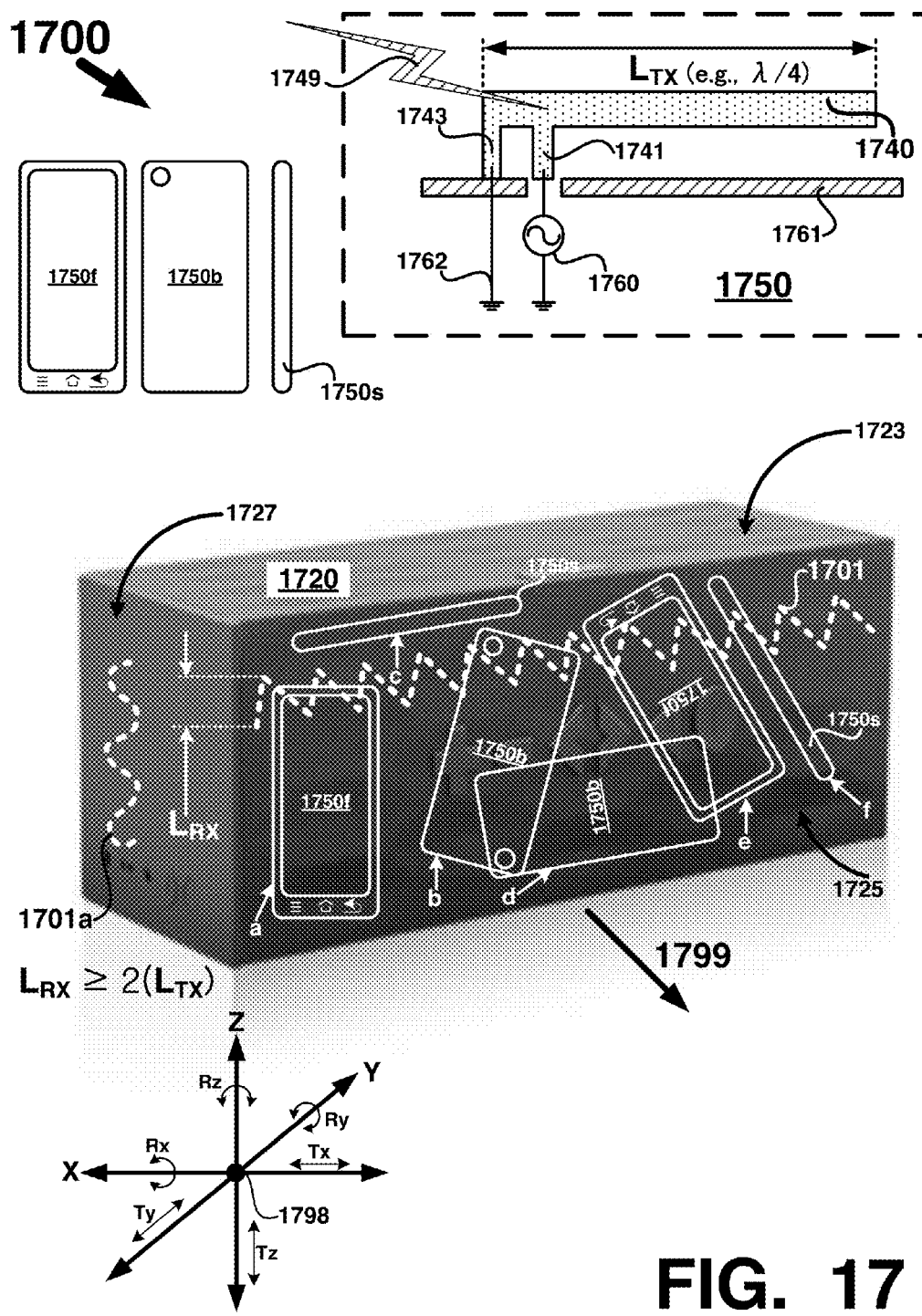
FIG. 17 depicts several examples of a wireless client device positions and orientations relative to a portion of a wireless device including one or more antennas that may be detuned to be non-resonant at a frequency of interest.

Attention is now directed to FIG. 17 where several examples of a wireless client device positions a-f and orientations 1750a-1750c relative to a portion of a wireless device including one or more antennas that may be detuned to be non-resonant at a frequency of interest are depicted. Prior to discussing positions a-f and orientations 1750a-1750c it may be helpful to first discuss typical antenna types that may be used in a variety of wireless client devices. Many wireless client devices use dipole or Planar Inverted-F Antenna (PIFA) type antennas. Other antenna types may include fractal antennas and other complex patterns that form the radiating element of the antenna. In that there are many designs, for purposes of explanation, an example of a PIFA is depicted in FIG. 17. Regardless of the type of antenna used, each antenna design has its own radiation and polarization pattern and those patterns may affect how signals transmitted by the antenna are received by a listening device, such as the antenna on the listening device. In the near field (NF) and in the far field (FF), orientation of the client device may change orientation of its antenna relative to the listening device. Therefore, received signal strength (e.g., RSSI or other measure) may change with client device orientation such that at the same distance from the listening device, RSSI may vary (e.g., by 6 db) merely by changing the orientation of the client device.

Now, getting back to FIG. 17, where one example PIFA antenna 1740 disposed in wireless client device 1750 (depicted in dashed line) may include a feed point 1741 electrically coupled with a signal source 1760 (e.g., in a RF system or radio of 1750), and a shorting pin 1743 electrically coupled to ground 1762. PIFA antenna 1750 may be positioned over a ground plane 1761. PIFA antenna 1750 or other types of antennas may be designed to transmit RF signals 1749 at a frequency such as those used in WiFi and/or Bluetooth, for example. PIFA antenna 1750 may have an electrical length $L_{TX}$ that is some fraction of the wavelength of the frequency (e.g., 2.4 GHz or other), such as a quarter-wavelength ($\lambda/4$), for example. Now as was described above in reference to FIGS. 10-11, the antenna (e.g., 1701, 1701a, 801, 901, etc.) may include sections (807, 907, 909) having a length (e.g., an electrical length) that may be at least two times greater than a half-wavelength of the frequency of interest. In FIG. 17, wireless client device 1750 may have a front portion 1750f (e.g., where the display is positioned), a backside 1750b (e.g., where the rear facing camera is positioned), and sides 1750s (e.g., left and right sides). Wireless device 1720 (e.g., a speaker box or media device) may include antenna 1701 positioned on one of its surfaces, such as a top surface 1725 (which is depicted facing direction 1799 for purposes of illustration), for example. Top surface 1725 may include device controls (e.g., see 1271 and 1281a in FIGS. 12A-12B). Antenna 1701 may be positioned on or below top surface 1725 and may be detuned to be non-resonant at a frequency of interest as was described above. Here, antenna 1725 may include sections having an electrical length $L_{RX}$ that may be at least two times the electrical length $L_{TX}$ of antenna 1740 (e.g., $L_{RX \geq 2(LRX)}$, or $L_{RX \geq 2}(\lambda/4)$).

To provide the seamless user experience of having transmitted RF signals 1749 from wireless client device 1750 being received with sufficient RSSI or other measure when positioned in contact with the surface 1725 or other surface of wireless device 1720, antenna 1701 may receive the transmitted RF signals 1749 from antenna 1740 at sufficient RSSI regardless of a position and/or orientation of the wireless client device 1750 when placed in contact with surface 1725. Therefore, when client device 1750 is placed into contact on top surface 1725, signal 1749 is received at sufficient RSSI in the following example positions and orientations: at a position a and an orientation 1750f (face up); at a position b and orientation 1750b (face down); at a position C and an orientation 1750s (left or right side resting on 1725); at a position d and the orientation 1750b; at a position e and the orientation 1750f; and at a position f and the orientation 1750s. Accordingly, regardless of position and/or orientation of the client device 1750 as placed by the user on top surface 1725, antenna 1701 may receive the transmitted signal 1749 with sufficient RSSI to reliably determine that client device 1750 is in the near field, and some action (if any) may be taken (e.g., via a wireless link) with regard to content, media, etc. on client device 1750 or some other location specified by client device 1750 or otherwise programmed to occur. Here, the user need not ponder, remember, or otherwise tarry as to how to position and orient the client device on top surface 1725. All the user need know is that the client device 1750 is to be placed somewhere on the top surface in any orientation, and the client device 1750, the wireless device 1720, another device, or some combination of those devices may handle subsequent actions to be taken (if any). X-Y-Z axis 1798 is depicted to illustrate that translations (Tx, Ty, Tz) and/or or rotations (Rx, Ry, Rz) of the client device 1750 while positioned on top surface 1725 (e.g., such as the positions a-f and orientations 1750f-1750s) are permissible by the user without affecting the ability of wireless device 1720 to detect RSSI from client device 1750 using antenna 1701. Wireless device 1720 may include more than one antenna, and may include antennas disposed on other surfaces, such as antenna 1701a.

Figure 18:
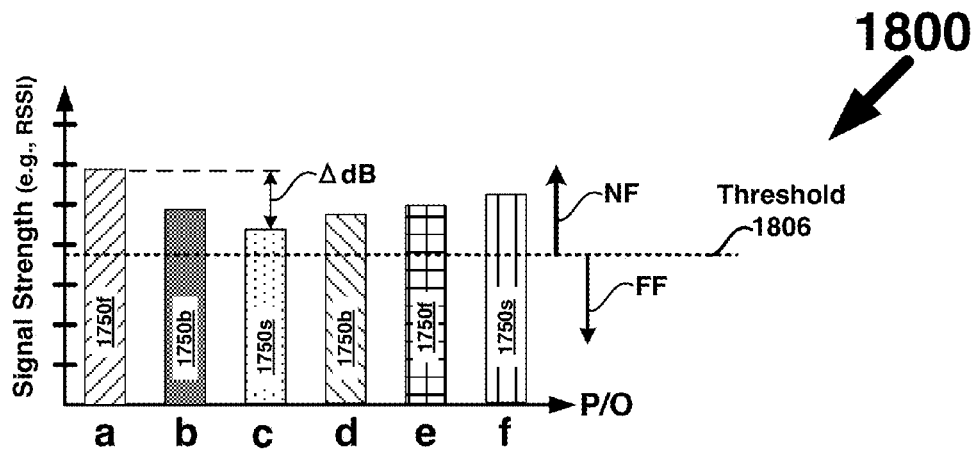
FIG. 18 depicts examples of received signal strength as a function of position and orientation of the wireless client device of FIG. 17.

Referring now to FIG. 18 where examples 1800 of received signal strength as a function of position a-f and orientation 1750f-1750s of the wireless client device 1750 of FIG. 17 are depicted. Here, along an X-axis, bar graphs for the various positions a-f and their associated orientations 1750f-1750s are denoted as P/O, and on a Y-axis a height of each bar graph is denoted as Signal Strength (e.g., RSSI) as determined by a RF system and/or radio that is coupled with antenna 1701 of wireless device 1720, for example. Assume for purposes of explanation that dashed line for Threshold 1806 may be a minimum signal strength required for reliable near field communication between the client device 1750 and wireless device 1720 (e.g., client device is positioned in the near field (NF) within threshold 106, 208, 308, 1606, 1506, 1406 as described above). Signal strengths below 1806 may be indicative of the client device 1750 being positioned in the far field (FF). Now for each of the six bar graphs, all signal strengths are above the minimum of 1806 when the user places the client device 1750 on top surface 1725 as depicted in FIG. 17. Moreover, there may be differences in signal strength ΔdB between different positions and orientations along the top surface 1725, such as between positions a and C, which may differ by several decibels (e.g., ΔdB≥2 dB). The differences in signal strength ΔdB between the different positions and orientations may not be relevant so long as each position/orientation has a signal strength that is at or above the threshold 1806. As will be discussed below, wireless device 1720 and/or client device 1750 may use their respective systems to bolster accuracy in determining contact between client device 1750 and wireless device 1720, to aid the user in making that contact, and for verifying successful contact.

Figure 19:
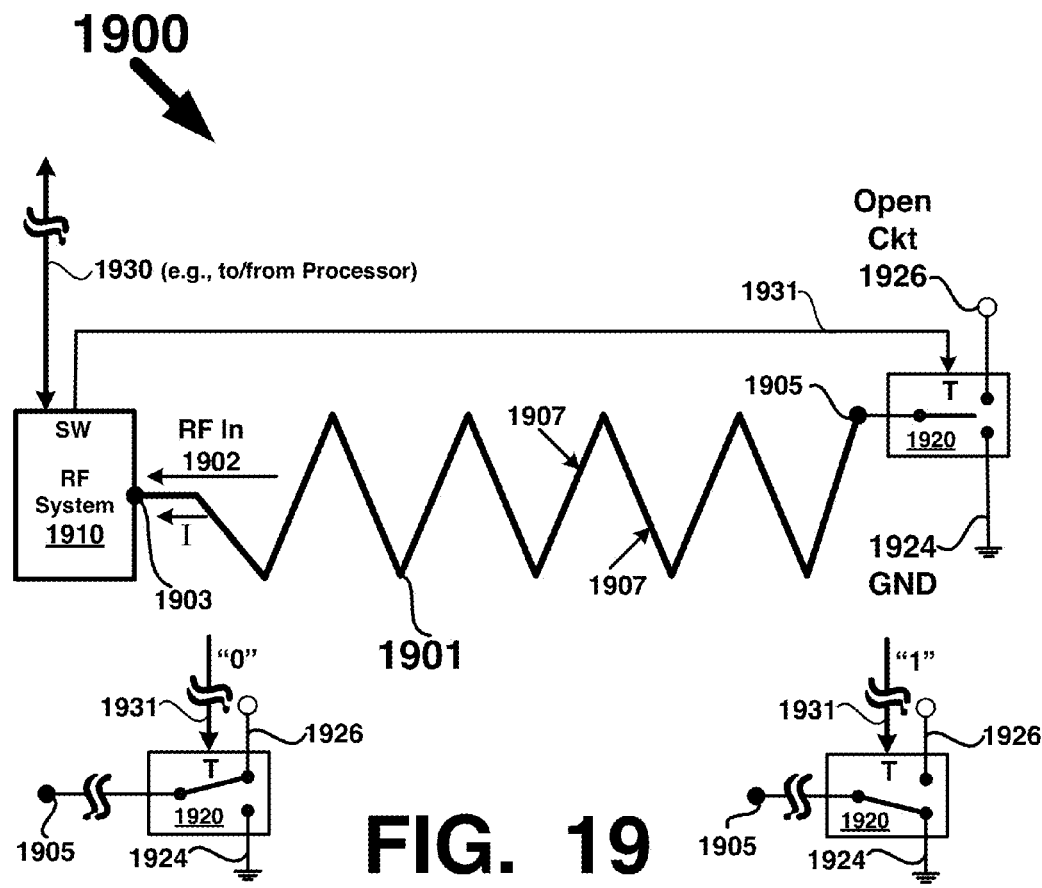
FIG. 19 depicts an example of a schematic for a switching circuit for reversibly coupling a node of an antenna that may be detuned to be non-resonant at a frequency of interest with a ground or an open circuit.

As described above, a second end of the antenna may be coupled with a potential, such as ground, an open circuit, or other potential, for example. In some applications, coupling of the second end to an open circuit may result in RF interference or other signals coupling with the antenna and generating a current in the antenna that is coupled into the RF system and/or radio. The current may reduce signal-to-noise (S/N) ratio and may impact accurate determination of received signal strength (e.g., RSSI or other measure of signal strength). FIG. 19 depicts an example of a schematic 1900 for a switching circuit for reversibly coupling a node 1905 (e.g., second end) of antenna 1901 that may be detuned to be non-resonant at a frequency of interest with a ground 1924 and an open circuit 1926. Here, RF system 1910 may have in input coupled with first end 1903 of antenna 1901. Open circuit coupling of second end 1905 may result in both RF In 1902 and current I being input to RF system 1910. RF system 1910 may be coupled 1930 with circuitry (e.g., a processor, μC, μP, DSP, etc.) that may sense that current I is present and command RF system 1910 to generate a signal on output SW that is coupled 1931 with a toggle input T on a switch 1920. For example, when the signal comprises a logic "0", switch 1920 may couple second end 1905 with open circuit 1926 or some other potential. As another example, when the signal comprises a logic "1", switch 1920 may couple second end 1905 with a ground 1924 or some other potential. Upon sensing current I having an effect on accurate determination of signal strength, RF system 1910 may activate or be commanded to activate output SW to cause switch 1920 to toggle from open circuit 1926 to ground 1924 (e.g., to a short circuit) to reduce or eliminate current I on input 1902.

Figure 20:
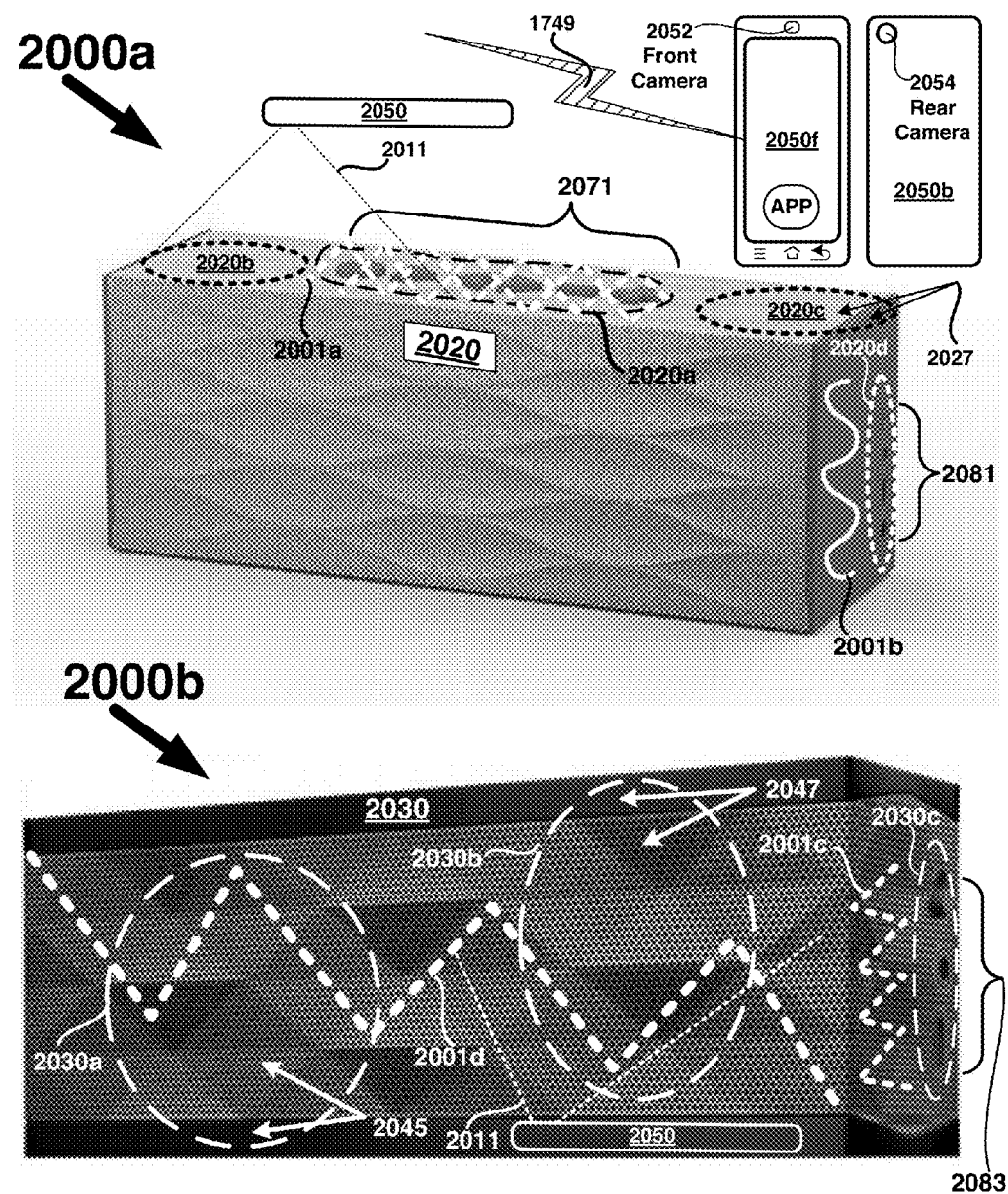
FIG. 20 depicts examples of a wireless client device including an image capture device for capturing images of features on a wireless device to determine near field proximity to and/or contact with the wireless device.

Other indicia of direct contact between a client device and the wireless device may be used to bolster confidence in received signal strength and to ensure the wireless client device is positioned in the near field (NF) and/or is in contact with the wireless device, as opposed to actually being positioned in the far field (FF) with received signal strength readings falsely indicating the client device is in the NF. FIG. 20 depicts examples of a wireless client device 2050 including an image capture device (2052, 2054) for capturing images 2011 of features (2020a-2020d and 2030a-2030c) on a wireless device (2020, 2030) to determine near field proximity to and/or contact with the wireless device wireless device (2020, 2030). A front 2050f of client device 2050 may include a front facing image capture device (front camera) 2052 and a rear 2050b of client device 2050 may include a rear facing image capture device (rear camera) 2054. An application (APP) on client device 2050 may include algorithms and/or data operative to recognize patterns, surface features, visible structures, textures or the like on one or more types of wireless devices, such as devices 2020 and/or 2030. As client device 2050 is moved into proximity of wireless device (2020, 2030) APP and/or an API may activate an image capture device (e.g., 2052, 2054) to capture images 2011 and process those images (e.g., using image processing algorithms) to determine if the captured images (e.g., still images and/or video images) match images of wireless devices, such as 2020 and/or 2030 in a library or other data store of images for wireless devices the client device 2050 may interface with, for example.

On wireless device 2020, features 2020a may include the buttons in control group 2071, features 2020b may comprise surface textures or features of a chassis of the device 2020, features 2020c may comprise surface textures or features of a chassis of the device 2020 and may include differences in color of different sections of the chassis as denoted by 2027. Features 2020d may include buttons and interface ports of group 2081. Features may be positioned on surfaces of devices 2020 and 2030 where antennas are positioned such as antennas 2001a, 2001b, 2001c and 2001d, so that the client device 2050 may capture 2011 images from relevant areas of the wireless devices it is to be positioned in contact with as described above, for example. In example 2000b, wireless device 2030 may be imaged 2011 in feature areas 2030a, 2030b, and 2030c, and color differentiation 2047 between different portions of chassis may be used to aid in pattern recognition. A control group 2083 may also comprise a feature that may be imaged 2011 by the client device 2050. The APP or a data base accessible by wireless client device 2050 may store reference data for images in the areas for the above described features, and the APP or other algorithm may use the reference data to determine proximity and/or physical contact between the client device 2050 and wireless device (2020, 2030). Optionally, additional systems in client device 2050 and/or wireless devices (2020, 2030) may be used separately or in conjunction with the imaging 2011 as will be described below in reference to FIG. 21.

Figure 21:
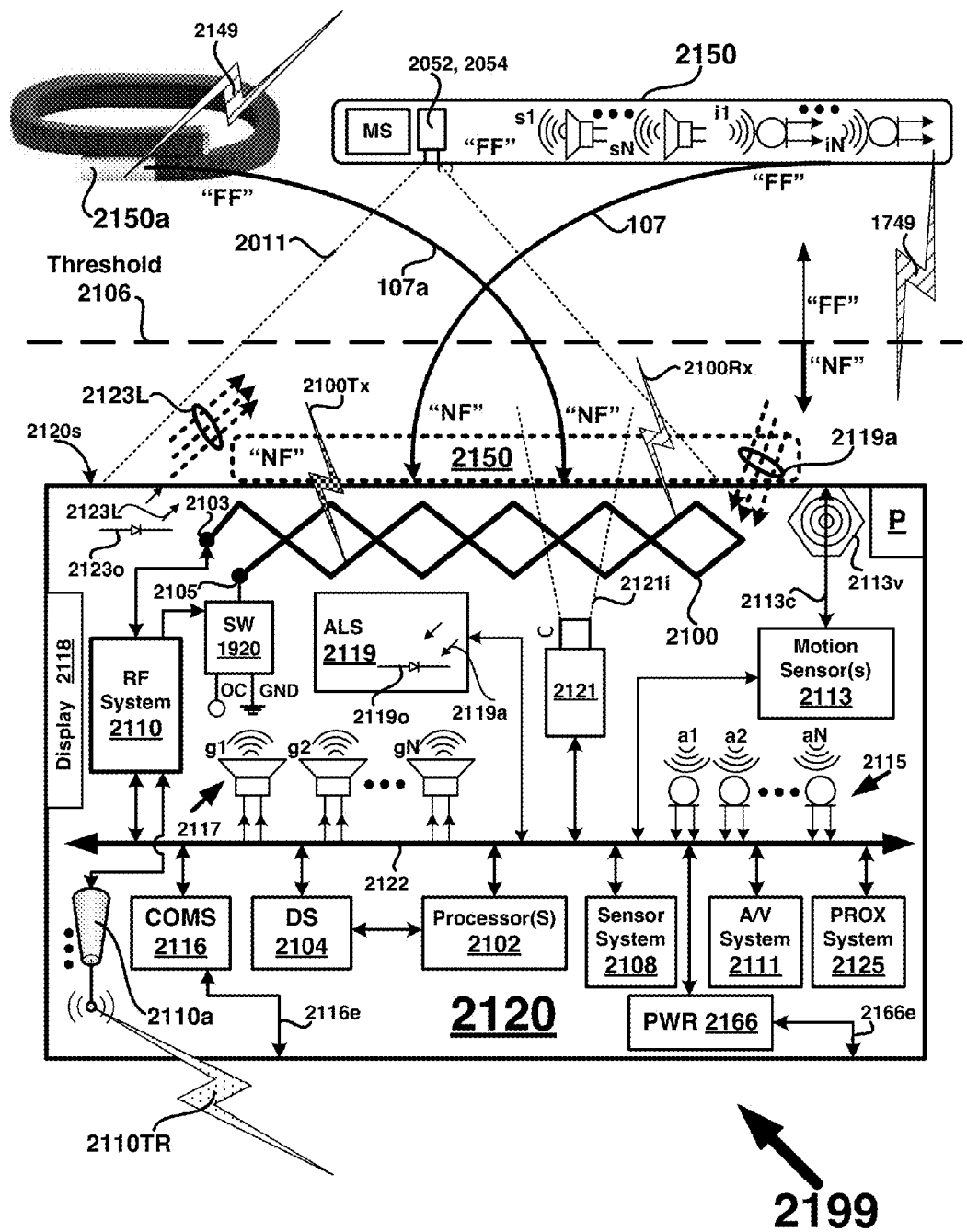
FIG. 21 depicts a block diagram of one example sensors and systems that may be utilized by a wireless device and/or wireless client device to determine proximity in a near field region.

Referring now to FIG. 21 where a block diagram 2199 depicts one example of sensors and systems that may be utilized by a wireless device 2120 and/or wireless client device (2150, 2150a) to determine proximity in a near field (NF) region. Wireless client devices 2150 (e.g., a smartphone, tablet, or pad) and/or wireless client device 2150a (e.g., a data capable strapband, fitness monitor, activity monitor, or smartwatch) may use their respective RF systems to ping RF transmissions (1749, 2149) and those RF transmissions may be detected by a receiver and/or transceiver in a RF system 2110 in wireless device 2120 (e.g., a speaker box or media device) which may be in a packet sniffing mode operative to detect data in packets being transmitted (1749, 2149) by client devices (e.g., 2150, 2150a), for example. MAC addresses, Bluetooth addresses, and other data may be included in the packets being transmitted (1749, 2149). Data in the packets and/or RSSI may be used by device 2120 to determine that one or more client devices are present in or near its environment and those devices may be positioned in the far field (FF), near field (NF), or moving to/from the NF to FF or FF to NF as determined by RSSI or some other measure of a RF power level being received by antenna 2100 and/or antenna 2110a, for example. In that RSSI may be relative received signal strength it may have arbitrary units such as 0 to 10 or 0 to 100, for example. Wireless client devices (2150, 2150a) may have any orientation on surface 2120s of wireless device 2120 as depicted for wireless client device 1750 in FIG. 17, for example.

Client device 2150 may include one or more audio transducers, such as one or more speakers s1 through sN for generating sound, one or more microphone i1 through iN for receiving incident sound from an environment (e.g., ambient sound) in which the client device is positioned, one or more motion sensors MS (e.g., an accelerometer, a gyroscope, a multi-axis accelerometer, a piezoelectric device, etc.) for detecting when client device has made contact with another device such as wireless device 2120, and one or more image capture devices (2052, 2054) which may comprise front and rear facing cameras for capturing 2011 images as was described above in reference to FIG. 20. Although not depicted in FIG. 21, client devices (2150, 2150*a*) may include processors, data storage, one or more radios, and other systems. The data storage may be used to store reference image data for wireless devices (e.g., 2020, 2030, 2120) to be compared with captured images 2011 to determine if the capture image 2011 matches a reference image for a wireless device.

Wireless device 2120 may include a RF system 2110 coupled with one or more antennas 2110*a* and coupled with antenna 2100, optionally, a switch 1920 coupled with RF system 2110 and second end 2105 of antenna 2100, an ambient light sensor 2119 that receives ambient light 2119*a* external to device 2120 (e.g., through a window or port), an image capture device 2121, one or more motion sensors 2113 (e.g., an accelerometer, a gyroscope, a multi-axis accelerometer, a piezoelectric device, etc.), one or more proximity detection islands P which may be coupled with a proximity (PROX) detection system 2125, one or more speakers 2117, one or more microphones 2115, an audio/video (A/V) system 2111, a sensor system 2108, one or more processors 2102, data storage (DS) 2104 (e.g., Flash Memory, DRAM, etc.), a communications (COMS) system 2116, one or more indicator lights 21230 (e.g., LED, OLED, LCD), and a power (PWR) system 2166 (e.g., a rechargeable battery). A bus 2122 and/or other electrically conductive structures may be used to electrically couple signals from the aforementioned systems and components with one another.

Wireless Client device(s) (2150, 2150*a*) and/or the wireless device 2120 may use their respective audio systems to emit sound (g1, g2, gN, s1, sN) from their respective speakers, and that sound may be detected (a1, a2, aN, i1, iN) by their respective microphones. The sounds emitted may be outside a range for human hearing (e.g., ultrasonic, ≤20 KHz, infrasonic, below about 100 Hz) such as infrasonic low frequency sounds and/or ultrasonic high frequency sounds. The sounds may be encoded with data including but not limited to commands, addresses, wireless access credentials, device ID's, etc. Infrasonic low frequency sounds may be produced by the speakers if they have sufficient driver size for generating long wavelength low frequency sound (e.g., a subwoofer). Typical wireless client devices may not have larger acoustic drivers (e.g., speakers) for generating low frequency sound (e.g., infrasonic) and those devices may be restricted to generating high frequency sound (e.g., ultrasonic). However, a speaker box or media device may have sufficient size and/or volume to accommodate a larger driver size for its speakers and may generate low frequency (e.g., infrasonic) sound. A plurality of microphones may be used to spatially identify location and/or direction of sound generated by one or more speakers in the wireless device 2120 and/or wireless client device(s) (2150, 2150*a*). As the client device(s) (2150, 2150*a*) move from the FF to the NF in a direction generally towards the device 2120, sounds (s1, sN) may be detected by microphones 2115 and processed by processor 2102 to determine when the generated sound is located within threshold 2106 and that determination may be used along with RSSI received by RF system 2110 using antenna 2100 to bolster a determination a client device is within threshold 2106 and/or is in direct contact with a surface (e.g., 2120*s*) of device 2120. In the above example, one or more speakers 2117 may generate the sound (g1, g2, gN) and one or more microphones in client device 2150 may receive the sound (1i, iN), or one or more speakers in the client device 2150 may generate the sound (g1, gN) and one or more microphones 2115 in device 2120 may receive the sound (a1, a2, aN), or both devices (2120 and 2150) may generate and receive sound to determine their locations relative to each other and to determine when the client device 2150 is within threshold 2106 and/or in direct contact with device 2120. Processing of signals from microphones 2115 and/or from microphones in client devices may use algorithms for echolocation or sonar to determine location, direction, motion of the sound source, and NF proximity of the sound source, for example.

Other systems in the client device(s) (2150, 2150*a*) and/or wireless device 2120 may be used individually or in combination to bolster a determination that a wireless client device is in direct contact with device 2120 and/or is positioned in NF proximity of device 2120 within threshold 2106. Motion sensor(s) 2113 may be used to sense physical contact between a client device and a chassis or housing for device 2120 by mechanical and/or acoustic energy generated by the contact and denoted as vibration 2113*v*. Energy generated by a touching, an impact, or a bringing together of the client device and the wireless device 2120 may be sensed by the motion sensor(s) 2113 (e.g., as vibration 2113*v*) and generate a signal(s) that may be processed by processor 2102 and/or associated algorithms embodied in a non-transitory computer readable medium (e.g., stored in DS 2104) and executing on processor 2102 and/or an external processor (not shown). Proximity detection island P may detect presence of the client device(s) and/or their respective users and generate a signal(s) that may be processed to determine NF proximity within threshold 2106 and/or contact with device 2120. Client device(s) (2150, 2150*a*) and/or their respective users may block or otherwise attenuate or affect ambient light 2119*a* as those devices are brought (107, 107*a*) into NF proximity and/or contact with device 2120. Ambient light sensor ALS 2119 may include one or more light detecting devices (e.g., an opto-electronic device 21190) such as photo diode or the like, that may generate an output signal indicative of a change in ambient light 2119*a* that is incident on 21190. One or more buttons in control group 2071 of FIG. 20 may be pressure sensitive or capacitive switches that may generate a signal when a force/pressure applied by at least a portion of a wireless client device when the wireless client device is resting on or is in contact with the button(s). That signal may be used to determine the wireless client device is in contact with wireless device 2120.

Wireless device 2120 may include an image capture device 2121 operative to capture images of a client device as the client device moves into NF proximity of device 2120 (e.g., within threshold 2106) or is placed into contact with device 2120 (e.g., is on surface 2120*s*). Signals from image capture device 2121 may be processed to determine proximity and/or contact of the client device (e.g., device 2150). Captured images may be compared with profiles and/or a library of reference images for client devices in a manner similar to that described above for image capture devices 2052 and 2054 of the client device 2150. A light source 2123*o* may be used to generate light 2123L that may be incident on and/or reflected off of the client device as it moves into proximity of the device 2120. Light source 2123*o* may be an opto-electronic device such as a LED, OLED or some other light source, such as an incandescent bulb, etc. In some examples, Light source 2123*o* and/or speakers 2117 may be used to provide audio and/or visual aids to a user of a client device to guide the user into bringing his/her client device into contact with device 2120 (e.g., resting on surface 2120*s* or other surface or structure of device 2120). Device 2120 may include a display 2118 (e.g., LCD, OLED, LED, etc.) that provides information to a user to aid the user in guiding his/her client device into contact with device 2120. DS 2104 may include files/data for sound and/or video instructions (e.g., MP3, WAV, FLAG, MPEG-4, AAC, etc.) that may be played back over speakers 2117 and/or displayed on display 2118. Light source 2123*o* may be activated (e.g., caused to blink or otherwise illuminate) to get the user's attention or provide a visual marker for placement of the client device 2150 on device 2120.

RF system 2110 may receive signals from antenna 2100 generated by received 2100Rx RF signals from RF transmissions (1749, 2149) from client devices (2150, 2150*a*). Action taken by device 2120 may be wirelessly communicated to device 2120 (e.g., transmitted from client devices or other wireless device, such as a WiFi router) using antenna 2100 and/or antenna 2110TR. In some examples, antenna 2100, antenna 2110TR or both may be operative to transmit RF signals, receive RF signals or both. For example, antenna 2110TR may be coupled with one or more radios, RF transmitters, or RF transceivers in RF system 2110 that are operative to transmit RF signals 2110TR using antenna 2110. Similarly, RF system may transmit RF signals 2100Tx using antenna 2100. Device 2120 may include more than one antenna (e.g., 2100) that may be detuned to be non-resonant at a frequency of interest and those antennas need not be identical to antenna 2100 and may be positioned at different locations in device 2120.

In the processes 500, 520, and 600 described above in regard to FIGS. 5A-6, the actions to be performed, if any, that may be taken (e.g., at or from stages 510, 528, 602) may be predicated and/or determined in part using one or more of the above described indicia of direct contact between a client device and the wireless device. One or more of those indicia as described in reference to FIGS. 20-21 may be used to bolster confidence and/or accuracy in received signal strength and to ensure the wireless client device (e.g., 2150, 2150*a*) is positioned in the near field (NF) and/or is in direct contact with the wireless device (e.g., 2120), as opposed to actually being positioned in the far field (FF) with received signal strength readings falsely indicating the client device is in the NF or is in contact with the wireless device. As one example, in process 600 of FIG. 6, the stage 602 may use one or more of the above mentioned indicia in its calculus for determining which action or actions (if any) are to be taken (e.g., actions associated with one or more of the stages 604, 606, 608, 610) based on the comparison of the received signal strength with the threshold and also based on factoring in one or more of the indicia to determine if the action will or will not be taken. A similar indicia based determination may be used in the processes for 500 and/or 520 at the stages 510 and/or 528.

Figure 22:
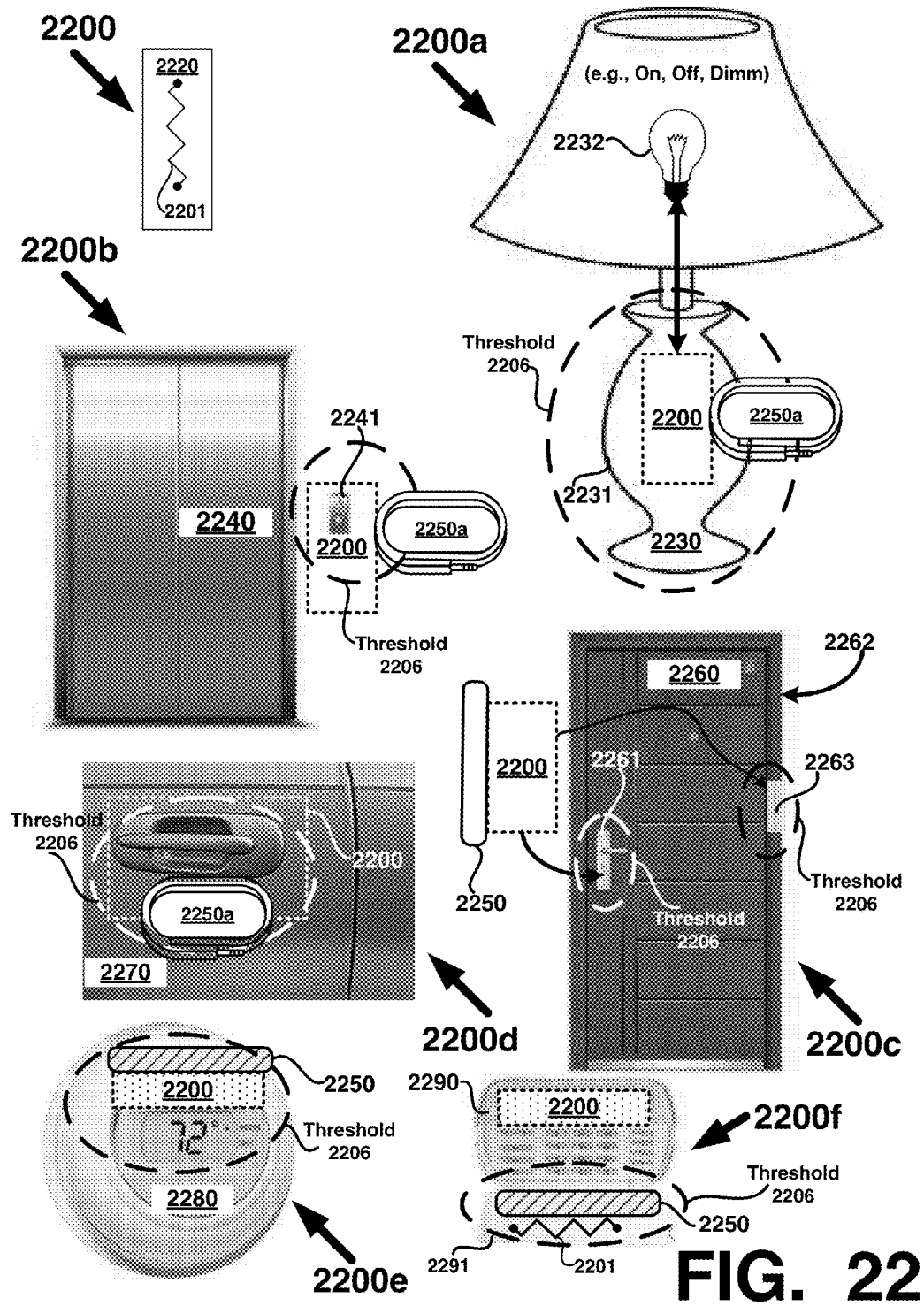
FIG. 22 depicts several examples of systems that may include an antenna that may be detuned to be non-resonant at a frequency of interest and associated circuitry for command, control, and access to other devices.

Attention is now directed to FIG. 22 where several examples 2200*a*-2200*f* of systems 2230-2290 that may include an antenna 2201 that may be detuned to be non-resonant at a frequency of interest and associated circuitry for command, control, and access to other devices are depicted. Here, antenna 2201 may be included in a system 2220 that may be physically and electrically integrated with other systems. System 2220 may comprise a radio system and one or more antennas 2201 as depicted in FIGS. 8A-11 or system 2220 may comprise one or more of the components or systems of wireless device 2120 of FIG. 21, for example. System 2220 may output a signal indicative of received signal strength (e.g., RSSI or other measure) from RF signals received by antenna 2201 and a system coupled with system 2220 may handle processing of the signal and take some action or other based on its processing of the signal.

In example 2200*a*, system 2200 may be integrated into a housing 2231 of a lighting fixture 2230. Although a lamp is depicted other types of lighting fixtures may include the system 2200 and the fixture 2230 is a non-limiting example. Here, when a wireless client device 2250*a* (e.g., a data capable strapband or other type of device) enters into threshold 2206 and/or makes contact with housing 2231, an action such as turning "On", "Off", or "Dimming" of a light source 2232 may be initiated. Controls on the client device 2250*a* or a GUI on a display of the client device may be used to control and/or determine actions to be taken by fixture 2230, for example. In other examples, when client device 2250*a* moves from NF proximity of fixture 2230 to FF proximity or out of RF signal reception range of system 2200, fixture 2230 may be configured to turn "Off" or to "Dimm" to conserve electrical power and/or reduce energy costs.

In example, 2200*b*, system 2200 may be integrated into a structure 2241 associated with a conveyance such as an elevator 2240. Structure 2241 may be a control panel for elevator 2240 that notifies machinery and systems that operate the elevator that a passenger wants to go up or down in a building that includes the elevator 2240. Here, wireless client device 2250*a* (e.g., a data capable strapband or other type of device) may be positioned by its user into direct contact with structure 2241 or within threshold 2206 to initiate some action to be taken with respect to elevator 2240. For example, the action may allow the elevator 2240 to be taken to a restricted access floor in a building or hotel. As another example, the action taken may be to allow access to the elevator 2240, such as allowing the elevator doors to open/close, to allow for selection of a destination floor on a control panel of the elevator 2240. As yet another example, the action taken may comprise performing maintenance on the elevator 2240, running diagnostics on elevator 2240, determining status of elevator 2240, etc.

In example 2200*c*, system 2200 may be integrated into a door handle 2261 or a structure 2263 in door frame 2262 for a door 2260. Wireless client device 2250 when placed into contact with and/or positioned within threshold 2206 of handle 2261 or structure 2263 may initiate some action, such as locking or unlocking the door 2260. Door 2260 may be coupled with an alarm system or security system and the action may comprise activating/setting an alarm for door 2260, canceling an alarm for door 2260, or determining a security status of door 2260.

In example 2200*d*, system 2200 may be integrated with a door 2270 on a vehicle or other mode of transportation such as an automobile or truck. Wireless client device 2250*a* may initiate some action when placed in contact with door 2270 and/or positioned in threshold 2206, such as locking/unlocking door 2270 or one or more other doors on the vehicle, setting/disabling an alarm system, rolling up/down windows of the vehicle, open close trunk/hatch of vehicle, open/close sunroof or convertible top of vehicle, stop/start engine of vehicle, activate/de-activate climate control system of vehicle, control one or more systems of vehicle, just to name a few.

In example 2200*e*, system 2200 may be integrated with an automation system 2280 (e.g., a thermostat, climate control, home automation system, etc.). Here, wireless client device 2250 contact and/or near field proximity inside threshold 2206 may be used to control one or more functions of automation system 2280, such as setting a temperature to 72° F. for a HVAC system, activating/deactivating a HVAC system, controlling a lighting system, monitoring/controlling energy usage, activating/deactivating a ceiling fan or attic fan, monitoring/controlling resource usage (e.g., water, gas, electricity, solar power, wind power, hydro power), monitor occupancy, monitoring/controlling appliances, controlling blinds or drapery, etc., just to name a few.

In example 2200f, system 2200 may be integrated into a security system 2290 (e.g., an alarm panel). Here, a door 2291 of the security system 2290 may include antenna 2201 which may be electrically coupled with a radio system (e.g., 810, 910) of system 2200. Placing a wireless client device 2250 into contact with door 2291 or in NF proximity inside of threshold 2206 may allow for access, control or other functions of security system 2290, such as setting alarms, disabling alarms, determining security system status, just to name a few, for example.

In the non-limiting examples depicted in FIG. 22, actions taken may be predicated and/or determined in part by on one or more other indicia as described above in reference to FIGS. 5A-6 and 21. System 2200 and/or wireless client devices (2250, 2250a) may include one or more of the systems and/or components described in reference to FIG. 21 for capturing the one or more other indicia. The wireless client devices may be configured via an application (APP) or other algorithm to wirelessly interact with system 2200 and/or the system it is integrated into. For example, instead of having a room key issued for a hotel, an APP may be installed on the client device that allows secure access to a room, elevator, or other secure place in a hotel, office building, etc. The APP may be programmed to expire, be disabled, or otherwise self-destruct after a predetermined time (e.g., 8 hours, 72 hours, seven days, six months, etc.). The APP may be programmed to allow access to a plurality of systems that include the system 2200 and those systems may be different, such as in examples 2200b and 2200e.

Concomitant with taking an action and/or prior to taking an action, the wireless device (e.g., 2120 or other) and wireless client device (e.g., 2150) may wirelessly link with each other or another shared wireless resource (e.g., a WiFi router) and may wirelessly exchange handshakes, wireless credentials, data, packets, addresses (e.g., MAC addresses, BT addresses), and other information that may or may not be associated with the action(s) to be taken.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A method, comprising:
   monitoring one or more devices in wireless data communication over a data network;
   receiving wirelessly, one or more data packets from each of the one or more devices;
   filtering the one or more data packets by evaluating a received signal strength of each of the one or more packets, the one or more packets being ordered in a priority based on a value;
   comparing the received signal strength of each of the one or more packets to a threshold;
   determining whether the one or more devices are to perform an action based on the comparing; and
   performing the action only after one or more indicia other than the received signal strength are considered and indicate that the received signal strength was accurately compared with the threshold.

2. The method of claim 1 and further comprising:
   identifying the one or more devices using an address.

3. The method of claim 1 and further comprising:
   identifying the one or more devices using a MAC address.

4. The method of claim 1, wherein the filtering the one or more data packets comprises prioritizing the one or more devices based on the received signal strength of each of the one or more devices.

5. The method of claim 4, wherein the one or more devices are prioritized in order of highest received signal strength to lowest received signal strength for each of the one or more devices.

6. The method of claim 1, wherein the action is performed if the received signal strength is greater than the threshold and the one or more indicia indicate a direct physical contact between a wireless device that is receiving wirelessly the one or more data packets and one of the one or more devices.

7. The method of claim 1, wherein the action is not performed if the received signal strength is not greater than the threshold.

8. The method of claim 1, wherein the action is not performed if the received signal strength is greater than the threshold and the one or more indicia indicate no direct physical contact between a wireless device that is receiving wirelessly the one or more data packets and one of the one or more devices.

9. The method of claim 1, wherein at least one of the one or more devices comprises a mobile device.

10. The method of claim 9, wherein the mobile device comprises a smartphone.

11. The method of claim 9, wherein the mobile device comprises a data capable strapband.

12. The method of claim 1, wherein the one or more indicia comprises an image of a wireless device that is receiving wirelessly the one or more data packets, the image captured by an image capture device of one of the one or more devices, the image indicating that one of the one or more devices is in a near field proximity of the wireless device.

13. The method of claim 12, wherein the near field proximity comprises direct physical contact between the wireless device and one of the one or more devices.

14. A system, comprising:
   a memory operative to store one or more data packets received from one or more devices operative to wirelessly transmit data over a data network; and
   a processor operative to monitor the one or more devices,
      to receive the one or more data packets from each of the one or more devices,
      to filter the one or more data packets by evaluating a received signal strength of each of the one or more packets, the one or more packets being ordered in a priority based on a value,
      to compare the received signal strength of each of the one or more packets to a threshold to determine whether the one or more devices are to perform an action, and
      to perform the action if one or more indicia other than the received signal strength indicate a direct physical contact between a wireless device that is receiving the one or more data packets and one of the one or more devices.

15. The system of claim 14, wherein the data network comprises a Bluetooth network.

16. The system of claim 14, wherein the data network comprises a Wi-Fi network.

17. The system of claim 14, wherein at least one of the one or more devices comprises a mobile device.

18. The system of claim 14, wherein the wireless device includes a RF system in electrical communication with the processor, the RF system including a radio electrically coupled with a first end of an antenna that is detuned to be non-resonant at a frequency the one or more data packets are transmitted at, the antenna including a plurality of segments oriented at angles to one another, an electrical length of each segment is at least one-half of a wavelength of the frequency, the antenna including a second end that is electrically un-coupled as an open circuit or is electrically coupled with a ground.

19. The system of claim 14, wherein the wireless device includes a RF system in electrical communication with the processor, the RF system including a radio electrically coupled with a first end of an antenna that is detuned to be non-resonant at a frequency the one or more data packets are transmitted at, the antenna including a plurality of segments oriented at angles to one another other, an electrical length of each segment is at least two times a quarter-wavelength of the frequency, the antenna including a second end that is electrically un-coupled as an open circuit or is electrically coupled with a ground.

20. The system of claim 14, wherein the one or more indicia comprises an image of the wireless device, the image captured by an image capture device of one of the one or more devices, the image indicating the direct physical contact between the wireless device and one of the one or more devices.

* * * * *